April 20, 1965 H. A. HUG 3,178,949
FRICTION DRIVE APPARATUS
Filed Jan. 6, 1960 10 Sheets-Sheet 7
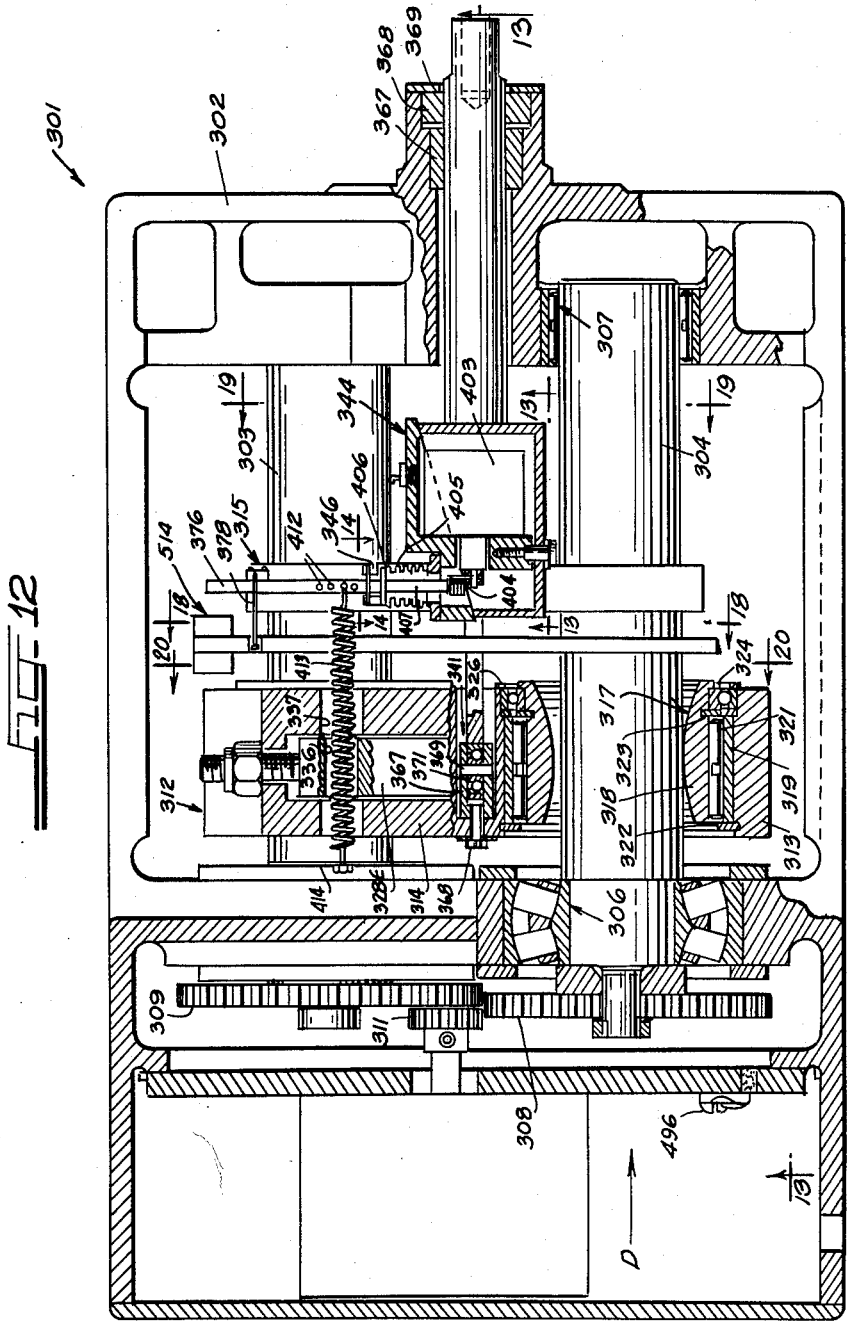
INVENTOR.
HANS A. HUG
BY
Wallace and Cannon
Attys.

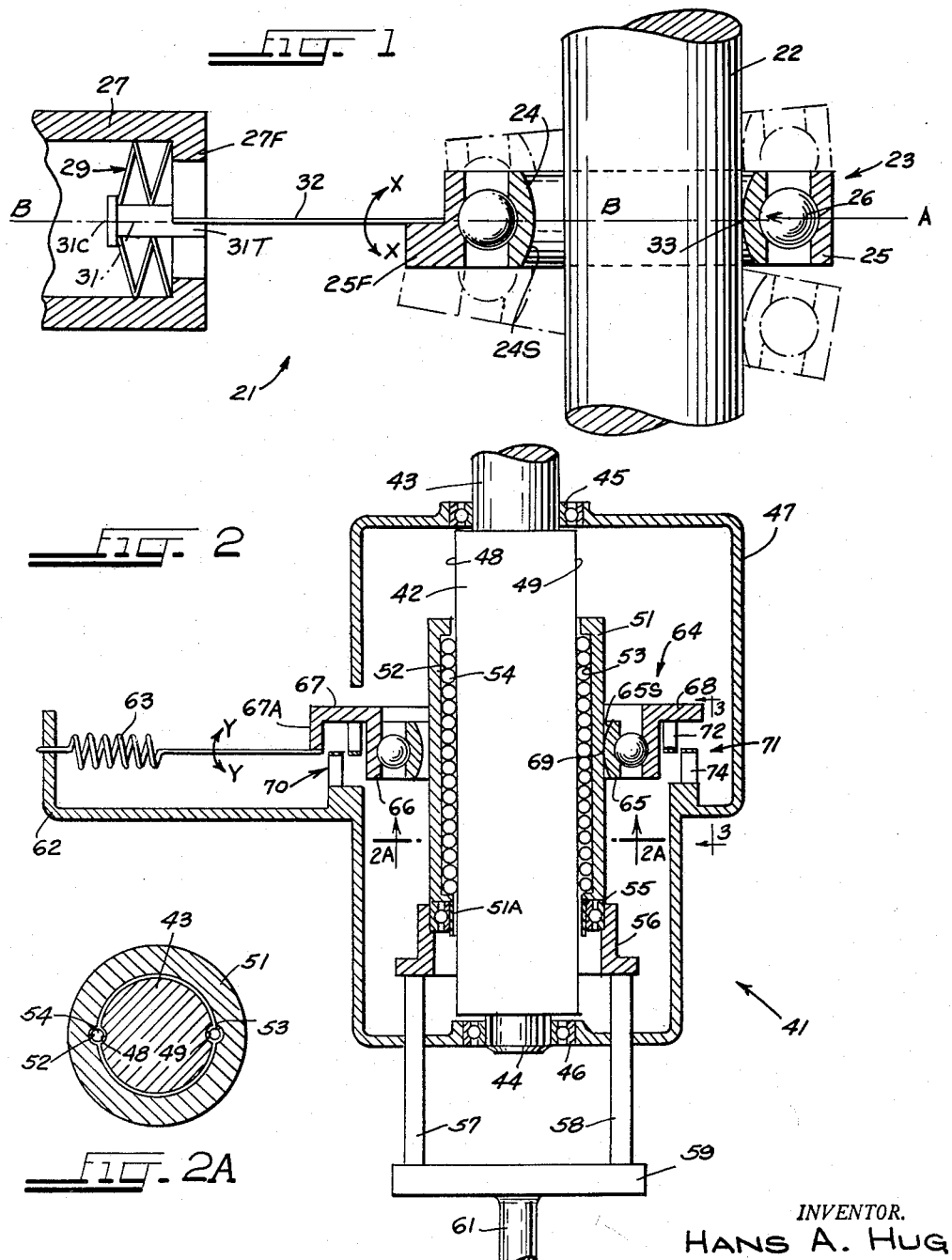

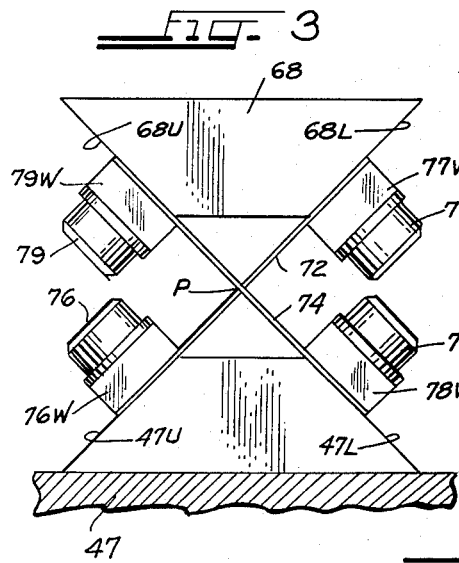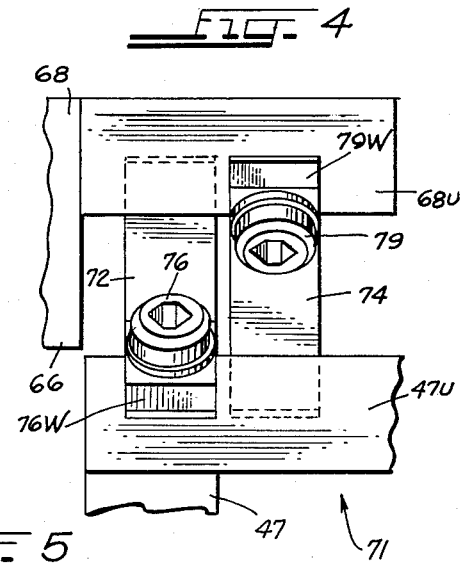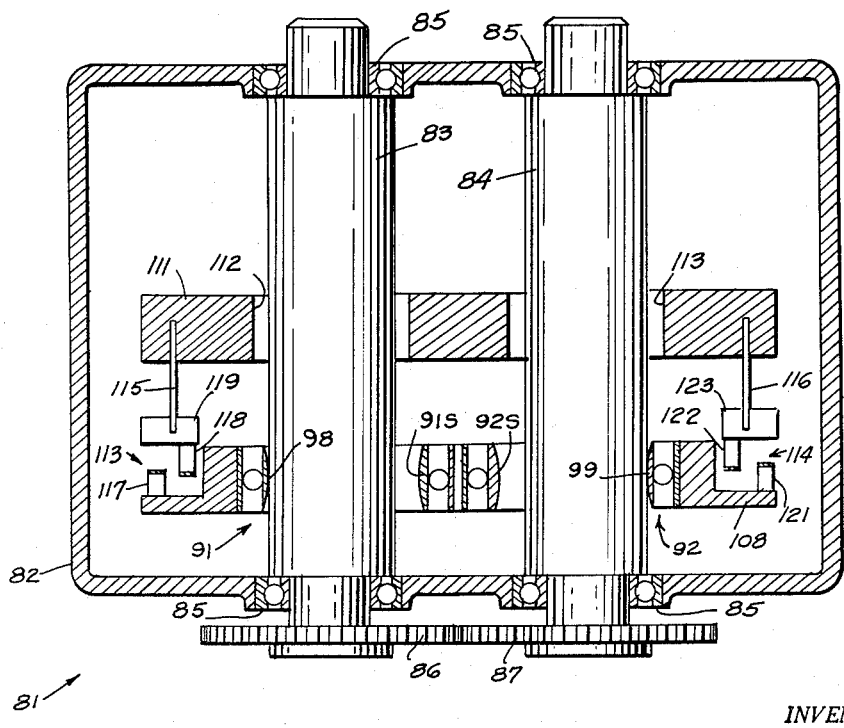

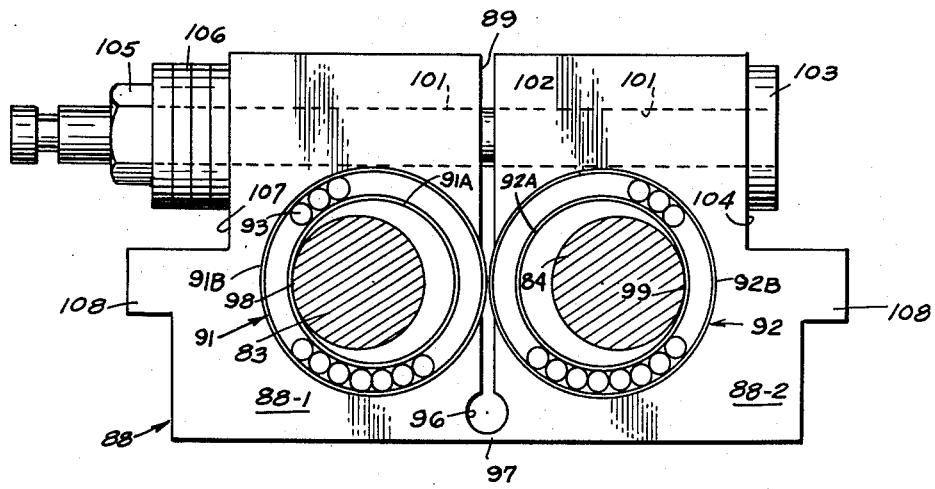
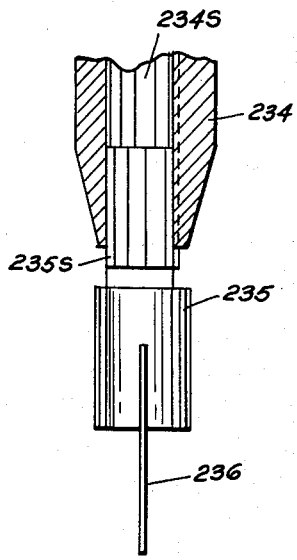

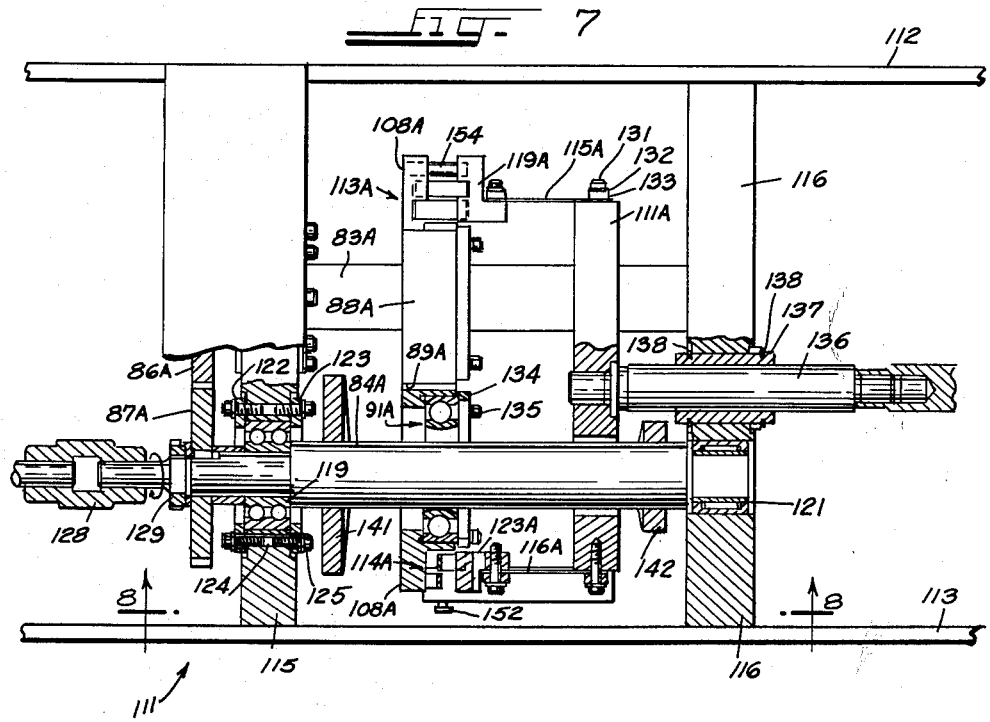
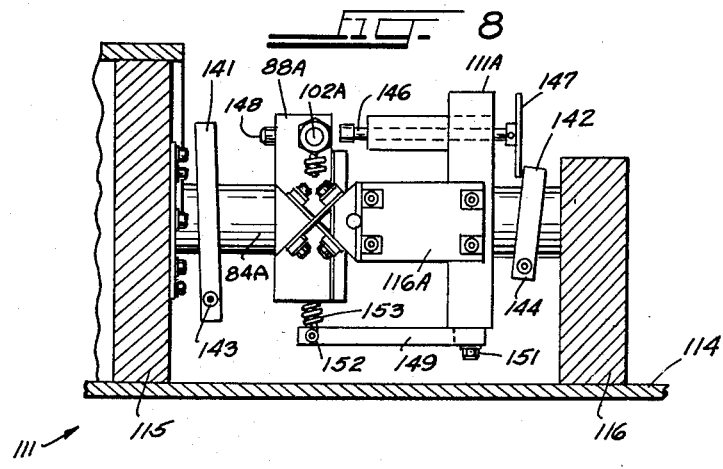

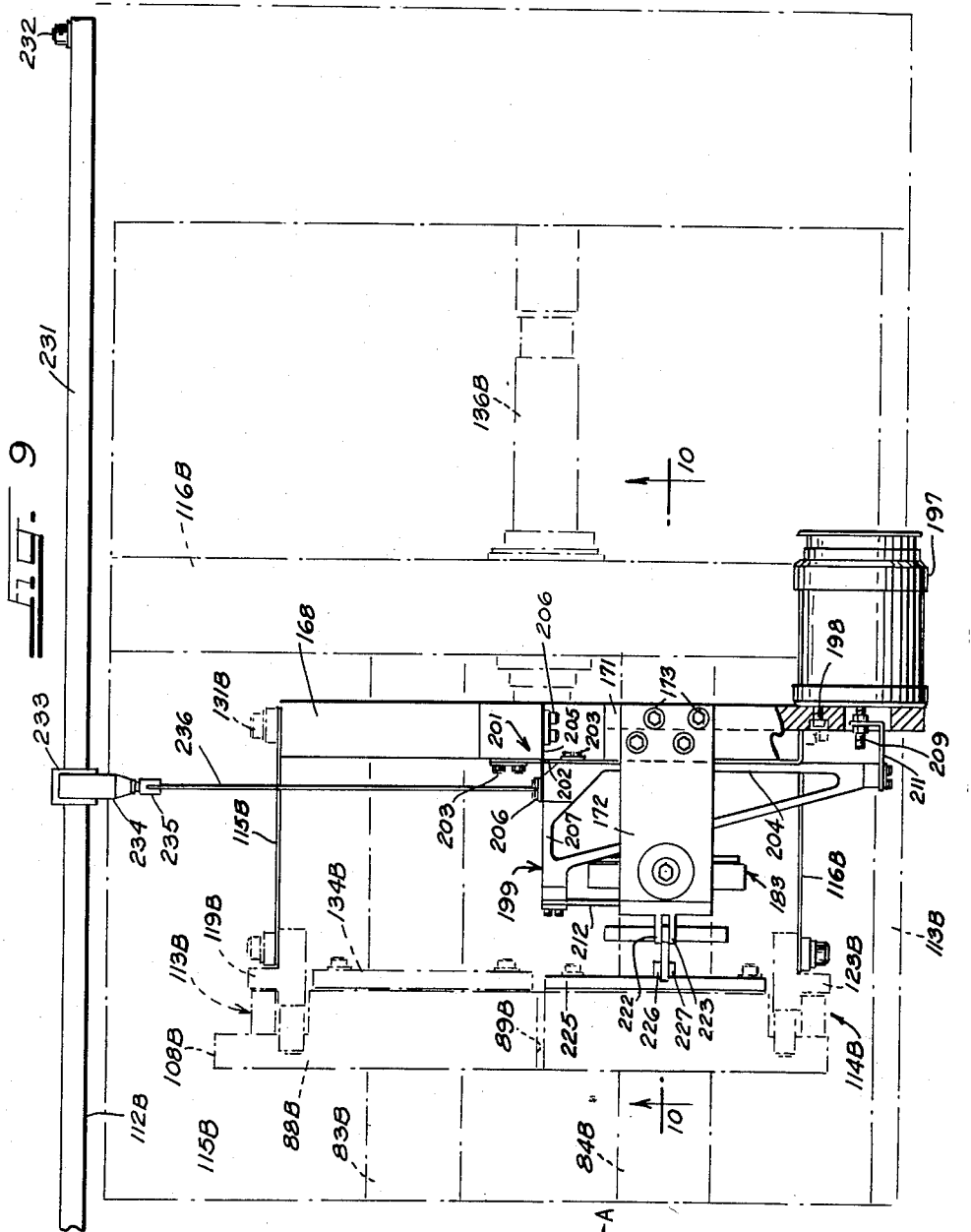

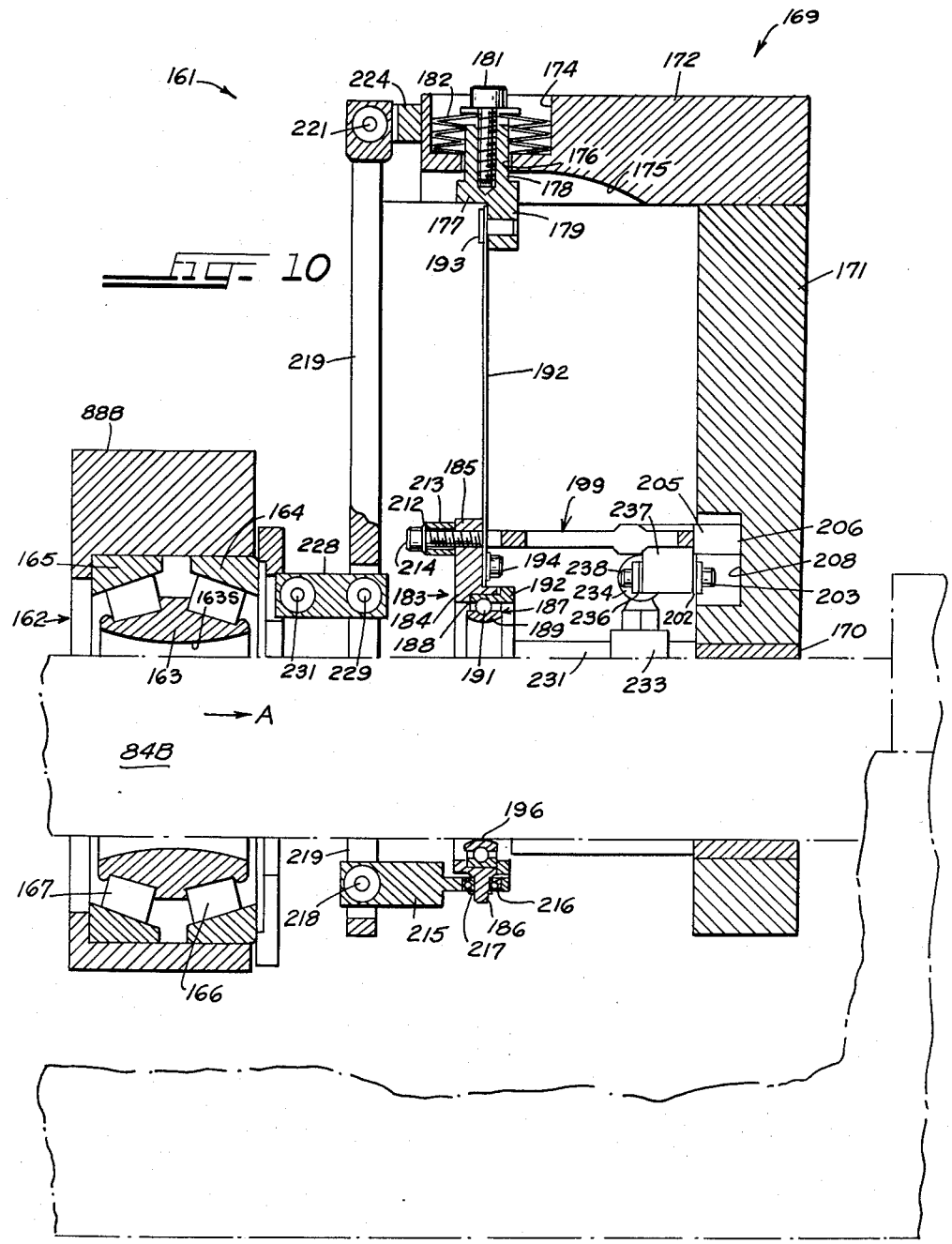

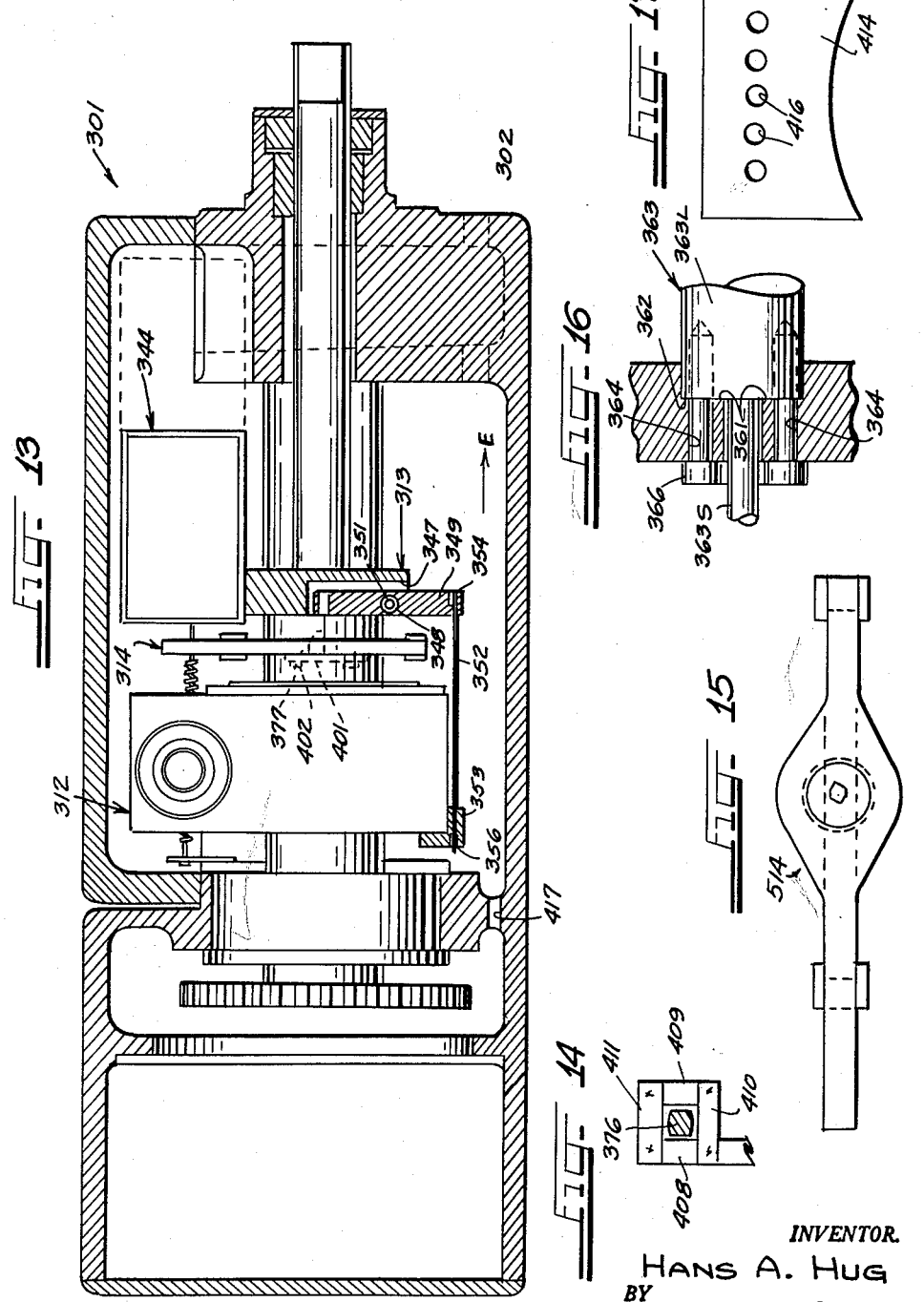

April 20, 1965
H. A. HUG
3,178,949
FRICTION DRIVE APPARATUS
Filed Jan. 6, 1960
10 Sheets-Sheet 9
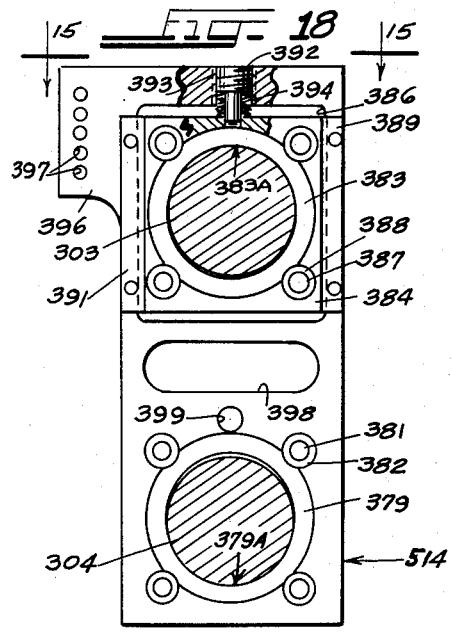
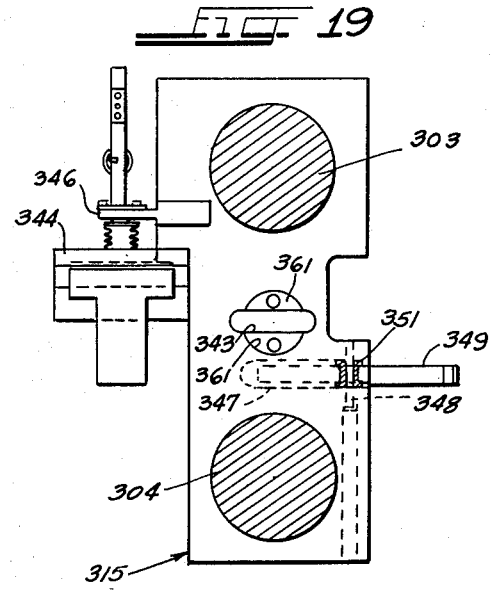
INVENTOR.
HANS A. HUG
BY
*Wallace and Cannon*

April 20, 1965 H. A. HUG 3,178,949
FRICTION DRIVE APPARATUS
Filed Jan. 6, 1960 10 Sheets-Sheet 10
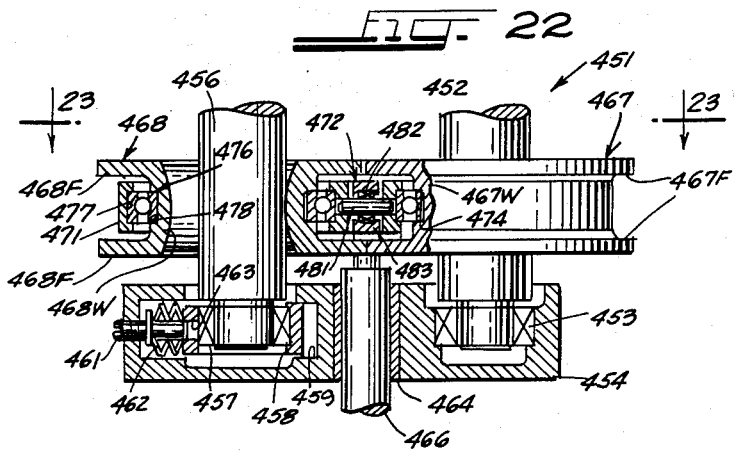
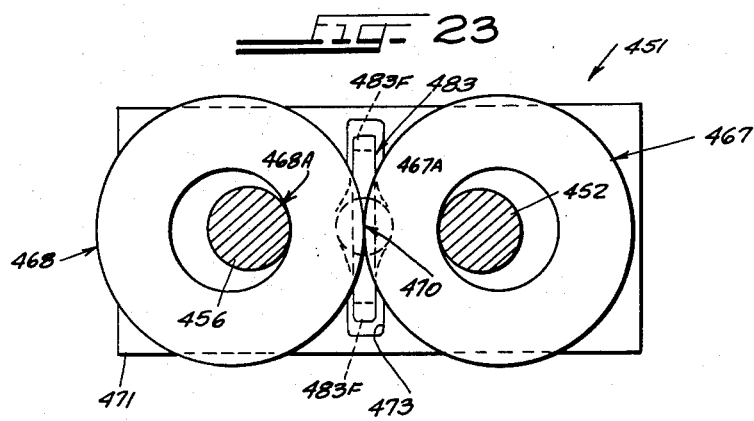
INVENTOR.
HANS A. HUG
BY
Wallace and Cannon
ATTYS.

United States Patent Office 3,178,949
Patented Apr. 20, 1965

1

3,178,949
FRICTION DRIVE APPARATUS
Hans A. Hug, Norwood, Mass., assignor, by mesne assignments, to American Brake Shoe Company, New York, N.Y., a corporation of Delaware
Filed Jan. 6, 1960, Ser. No. 842
25 Claims. (Cl. 74—25)

This invention relates generally to friction drive systems of the kind wherein a rotating shaft imparts an axial motion or thrust to a ring which is biased into frictional engagement with the shaft and which is tiltable with respect to the shaft. More specifically, this invention relates to a force transmitting apparatus for producing such frictional engagement, to apparatus for connecting a plurality of such rings to a common force output member, and to a servo arrangement for obtaining a variable, selected amount of movement of the ring or rings in an axial direction along the shaft.

In friction drive systems of the general character as noted hereinabove there is generally incorporated a ring, which will be hereinafter referred to as a rollring, which comprises an inner annulus rotatable within an outer annulus on balls that are retained therebetween. The inner periphery of the inner annulus of the rollring is disposed in encircling relation with a shaft which has a smaller outside diameter than the inside diameter of the inner annulus of the rollring. A radial biasing force is exerted on the outer annulus to engage a portion of the inner periphery of the rollring in frictional contact with the exterior surface of the shaft.

So long as the longitudinal axis of the rollring is maintained parallel to the longitudinal axis of the rotating shaft the inner annulus of the rollring rotates freely with the rotating shaft and the rollring remains at a fixed axial position with respect to the shaft. Upon tilting the rollring about the area of contact to displace the rollring from this null position to a position wherein the respective axes are disposed in non-parallel relation to one another, the peripheral contact of the rollring traverses a helical path along the outer surface of the rotating shaft to exert an axially directed thrust through the balls and move the rollring in an axial direction along the shaft. The rate at which the rollring moves axially upon the shaft is determined by the angular inclination of the rollring with respect to the shaft. The rollring will move axially along the shaft until it is either returned to the null position or is restrained from such axial movement by a force sufficient to overcome the frictional force developed at the area of contact between the ring and the shaft by the above noted radial biasing force and thus cause the inner periphery of the rollring to slip on the external surface of the shaft. Thus, the rollring enables either an axial motion, an axial thrust, or a combination of the two to be obtained from the rotary motion of the shaft.

In the conventional friction drive systems heretofore known the radial biasing force has been applied through a bearing type of pivot so that the frictional action of the bearing is mixed with the signal force applied to tilt the rollring.

It is a primary object of this invention to tilt a rollring of the above described character about the area of frictional engagement with the shaft in a manner such that as little friction as possible is mixed with the signal force applied to tilt the rollring to thereby afford a more sensitive response of the rollring to the signal or force applied to tilt the rollring than possible with arrangements heretofore known. It is a related object to incorporate an elastically deformable, flexible tension member as a radial loading device whereby the rollring is tiltable by frictionless torsional deformation of the tension member so that the only friction encountered in applying an input signal to tilt the rollring is that necessitated by the frictional engagement of the inner periphery of the rollring on the shaft.

It is another object of this invention to interpose a spline between the rollring and the shaft whereby tilting of the rollring is effective to move the spline axially and exert an axial thrust throughout the extent of the travel permitted by the spline while the rollring is retained at a fixed axial position with respect to the shaft.

It is another object of this invention to incorporate in a friction drive system of the general character described a pair of rollrings and a construction which enables equal and oppositely directed forces to be exerted on the rollrings and further enables both rollrings to be tilted as a unit. Such a construction may incorporate a deck member which mounts two rollrings therein for individual frictional engagement with parallel and oppositely rotating shafts, and the deck member may be partially split between the portions mounting the rollrings to permit the separate portions to be moved toward one another to vary the pressure of the frictional contact between the rollrings and the shafts.

It is another object of this invention to incorporate flexure pivots at opposite ends of such a rollring deck member so as to mount the deck member for tilting action about an axis passing through the areas of contact of the rollrings and shafts through frictionless flexure of the flexure pivots.

It is another object of this invention to incorporate with such flexure pivots flexible connecting members which are transversely disposed to the deck member and connected at opposite ends to the flexure pivots and an output member so as to take-up any misalignment between the rotating shafts and the rollring deck by an elastic deformation of the connecting members.

It is another object of this invention to incorporate a friction drive system of the general character desrcibed in a servo system which includes a variable signal input force for tilting the rollring and a feedback device which sums up the resultant axial travel of the rollring and applies a force, varying in magnitude with the extent of the axial movement, in opposition to the input signal force whereby the extent of the axial movement may be controlled by the magnitude of the input signal force.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a fragmentary plan view, in section, of one embodiment of this invention which incorporates a tension member for applying a radial load and which tension member is elastically deformable in torsion to enable the rollring to be tilted to produce axial movement as illustrated by the phantom outlines;

FIG. 2 is a plan view, in section, of another embodiment of this invention which incorporates a ball spline to obtain a greater axial movement of a force output member than can be obtained with the embodiment illustrated in FIG. 1;

FIG. 2A is a sectional view in the direction of the arrows 2A in FIG. 2;

FIG. 3 is an enlarged fragmentary end elevation view taken in the direction of the arrows 3—3 in FIG. 2 and showing details of a flexure pivot;

FIG. 4 is an enlarged fragmentary plan view of the flexure pivot illustrated in FIG. 3;

FIG. 5 is a plan view, in section, of another embodiment of this invention which incorporates two parallel counter-rotating shafts and an arrangement of two rollrings in a deck member for converting the rotation of the shafts to an axial thrust and applying such thrust through flexure members to a common force output member;

FIG. 6 is an elevation view of the deck member incorporated in the embodiment illustrated in FIG. 5;

FIG. 7 is a plan view, partly in section, of another embodiment of this invention which incorporates a dual shaft arrangement as illustrated in FIG. 5 and which further incorporates an automatic tilting device for producing a continuous reciprocating movement of the rollrings and force output member along the shafts;

FIG. 8 is an elevation view taken in the direction of the arrows 8—8 in FIG. 7;

FIG. 9 is a plan view of another embodiment of this invention comprising a servo system which incorporates a dual shaft arrangement like that illustrated in FIG. 5;

FIG. 10 is an elevation view taken in the direction of the arrows 10—10 in FIG. 9;

FIG. 11 is an enlarged fragmentary view of a portion of a feed back device incorporated in the embodiment of the invention illustrated in FIG. 9;

FIG. 12 is a plan view, partly in section, of a friction drive arrangement constructed in accordance with another embodiment of this invention;

FIG. 13 is a side elevation view, partly in section, and taken generally in the direction of the arrows 13—13 in FIG. 12;

FIG. 14 is an enlarged fragmentary detail view taken in the direction of the arrows 14—14 in FIG. 12;

FIG. 15 is an enlarged end view of a servo deck utilized in the friction drive arrangement illustrated in FIG. 12 taken generally in the direction of the arrows 15—15 in FIG. 18;

FIG. 16 is an enlarged fragmentary detail view illustrating the connection between an output deck and an output shaft utilized in the arrangement illustrated in FIG. 12;

FIG. 17 is an enlarged elevation view of a spring mounting plate utilized in the arrangement illustrated in FIG. 12;

FIG. 18 is an elevation view of a servo deck as taken in the direction of the arrows 18—18 in FIG. 12;

FIG. 19 is an elevation view of an output deck as taken in the direction of the arrows 19—19 in FIG. 12;

FIG. 20 is an elevation view of a power deck as taken in the direction of the arrows 20—20 in FIG. 12;

FIG. 21 is a plan view taken in the direction of the arrows 21—21 in FIG. 20;

FIG. 22 is a plan view, partly in section, of an arrangement of a friction drive apparatus constructed in accordance with another embodiment of this invention; and FIG. 23 is an elevation view taken in the direction of the arrows 23—23 in FIG. 22.

It is a primary attribute of this invention that the radial load which is applied to engage the rollring and the shaft mixes as little friction as possible with the input signal which is applied to tilt the rollring and produce axial movement of the rollring along the shaft. The embodiment of the invention illustrated in FIG. 1 incorporates a flexible tension member which is elastically deformable in torsion for applying the radial load.

With reference now to FIG. 1, a friction drive system is designated generally by the reference numeral 21. The friction drive system 21 includes a shaft 22 which may be rotated in either direction of rotation. An annularly divided rollring structure 23 includes an inner annulus or rollring 24 and an outer annulus 25. A plurality of balls 26 are retained in a conventional manner between the inner and outer annuli and enable the inner annulus 24 to rotate with the shaft 22 and within the outer annulus 25. A flange 25F is formed at one portion of the outer periphery of the outer annulus. Throughout the following specification and in the appended claims, the term "annularly divided rollring structure" is applied to any construction including an inner annulus or rollring, such as the member 24, and an outer annulus or member such as the member 25 that affords a bearing for the rollring, permitting rotational movement of the two members of the structure relative to each other but not allowing translational or tilting movement between the two members of the structure. Thus, as noted hereinafter, sleeve bearing or roller bearing structures may be utilized in an annularly divided rollring structure without departing in any way from the present invention.

A supporting frame 27 is mounted in a fixed position with respect to the rotatable shaft 22. The frame 27 includes an inwardly directed annular flange 27F which forms a seat for a stack of Belleville springs 29. A tension block 31 extends axially through the center of the stack of springs 29 and includes an enlarged collar 31C at one end which engages the inner end of the outermost spring in the stack. The tension block 31 includes an axially projecting tab 31T at the end opposite the collar 31C.

A relatively thin and narrow tension member 32 is connected at opposite ends to the flange 25F and the tab 31T. Thus, the tension member 32 transfers the biasing force of the spring stack 29 from the tension block 31 to the outer annulus 25 of the rollring structure 23. This radially applied tension force is applied, as a compressive force, through the balls 26 to the inner annulus 24 as indicated by the arrow A in FIG. 1.

As illustrated in FIG. 1, the inner annulus 24 is preferably provided with a convexly curved inner periphery 24S. This inner periphery 24S surrounds the outer surface of the shaft 22 and the inner diameter of all portions of this convex surface 24S is greater than the outside diameter of the shaft 22. The tension force applied through the tension member 32 biases the rollring structure 23 to a position wherein a portion of the convexly curved inner periphery 24S frictionally engages the cylindrical outer surface of the shaft 22 at an area of contact 33.

In operation, a signal force is applied to the rollring structure 23 to tilt the structure as indicated by the arrows XX in FIG. 1. As viewed in FIG. 1 the rollring structure is tilted about an axis B which lies within the plane of the section illustrated in FIG. 1 and which passes through the area of contact 33 and through the geometrical center of the rollring 23 and which also passes through the tension member 32. Depending upon the direction of rotation of the shaft 22 and the direction in which the rollring structure 23 is tilted, the frictional engagement of the inner periphery 24S of the rollring and the outer surface of the shaft 22 causes the contacting portion of the rollring to traverse a generally helical path on the outer surface of the shaft to move the entire rollring structure axially of the shaft to one of the positions illustrated in phantom outline in FIG. 1.

The force required to produce such tilting action need be sufficient only to overcome the resistance to pivoting generated by the frictional contact 33 and the force required to twist the tension member 32. The frictional resistance to pivoting action at the contact 33 is relatively small in comparison to the radial loading exerted through the tension member 32, and the thin and narrow tension member 32 offers little resistance to torsional deformation within the elastic range of such deformation. Since the axial thrust available from the rollring structure 23 is dependent upon the radial tensile load applied by the member 32 and the coefficient of friction between the annulus 24 and the shaft, a considerable axial thrust may be made available by applying a relatively large radial load through the tension member 32. The force required to overcome the frictional force at the area of contact and thereby slip the inner periphery of the rollring on the shaft is large compared to the torque required to pivot the rollring at this area of contact. It is apparent, therefore, that the friction drive system 21 affords an effective mechanical amplifier arrangement in that a relatively small signal torque applied to tilt the rollring is amplified by the rotational torque of the shaft 22 and is available as a relatively large axial thrust through the frictional contact of the rollring on the shaft. The manner in which the radial loading is applied to the tension member 32 enables the signal force to act substantially independently of the radial loading since the force required to twist and torsionally deform the tension member 32 is essentially independent of the tension within the member. Thus, as little friction as possible is mixed with the input signal so that the friction drive apparatus acts to amplify the input signal in an efficient and substantially uniform manner for varying radial loads applied by the spring stack 29.

It will be recognized that the axial movement of the rollring structure 23 is limited in the embodiment illustrated in FIG. 1 and therefore an axial thrust, which is available by a direct connection to the rollring structure, may be exerted through only a limited axial distance. Thus, while the stack of Belleville springs 29 may be compressed to permit some axial movement as indicated by the phantom outlines, the tension force transmitted to the member 32 increases and acts in a restraining manner to overcome the frictional force developed at the contact 33, whereupon the inner periphery of the rollring 24 slips on the outer surface of the shaft 22.

The rollring structure has been illustrated in FIG. 1 as a ball bearing rollring, but other constructions may be utilized. For example, the inner annulus could be mounted for rotation within an outer housing by means of a sleeve bearing.

In FIG. 2 there is illustrated a friction drive system which incorporates a ball spline disposed intermediate the rotatable shaft and the inner annulus of the rollring structure and which enables the axial force to be exerted through a considerably greater axial distance than in the embodiment illustrated in FIG. 1.

In FIG. 2 a friction drive system is designated generally by the reference numeral 41 and includes a shaft 42 which is rotatably mounted in a frame 47 at turned-down ends 43 and 44 which are received within the ball bearing mounts 45 and 46. The shaft 42 includes axially extending, recessed grooves 48 and 49 in its outer surface. A tubular housing 51 surrounds the shaft 42 and includes axially extending grooves 52 and 53 which are recessed within the inner peripheral surface of the housing 51. A plurality of balls 54 are disposed within each of the raceways defined by the grooves 48, 52, and 49, 53. The housing 51 includes conduit means, which are not illustrated, for recirculating the balls 54 between opposite ends of the raceways. The balls 54 act to rotate the housing 51 with the shaft 42 while permitting the housing 51 to move axially of the shaft in a low friction manner. It will be understood that the dual raceways are illustrative only. In actual practice it may be desirable to incorporate three or more equally spaced raceways or some other form of spline.

The housing 51 is formed with an axially projecting, reduced diameter sleeve 51A at one end thereof. A ball bearing 55 has an inner race mounted on the sleeve 51A and an outer race attached to an annular ring 56. A pair of rods 57 and 58 are slidably received within the end walls of the frame 47 at locations disposed radially outwardly of the ball bearing 46. The rods 57 and 58 are attached at opposite ends to the ring 56 and to a disc 59 which in turn mounts a force output member 61 thereon.

FIG. 2A is a section view taken in the direction of the arrows 2A in FIG. 2 and illustrates the manner in which the balls 54 are contained within the raceways formed by the grooves 48, 52 and 49, 53.

A ball bearing rollring structure 64 includes an inner annulus 65 which has a convexly curved inner periphery 65S encircling the ball spline housing 51. The inner periphery 65S has a greater internal diameter than the external diameter of the housing 51. The rollring structure 64 also includes an outer annulus 66 which is formed with radially outwardly extending flanged portions 67 and 68 at diagonally opposed portions of the outer circumference. The flange 67 includes a depending arm 67A and the spring 63 is attached to this arm through a tension member to exert a radial tensile load on the rollring structure 64 to engage a portion of the inner periphery 65S in frictional contact with the outer surface of the housing 51 at an area of contact 69.

In accordance with this invention the friction drive system illustrated in FIG. 2 incorporates flexure pivots 70 and 71 at diagonally opposite portions of the rollring and these flexure pivots mount the rollring for pivoting action within the frame 47. The flexure pivots are identical in construction and for that reason the detailed description of the component parts of the flexure pivot assemblies will be confined to the pivot 71, from which the detailed, enlarged end elevation of FIG. 3 and the plan view of FIG. 4 have been taken.

The flexure pivot 71 comprises spaced apart and transversely disposed flexible metal strips 72 and 74. The strip 72 is connected at opposite ends to a beveled face 47U of the frame 47 and a beveled face 68L of the flange 68 by shoulder cap screws 76 and 77 respectively as illustrated in FIG. 3. In like manner the strip 74 is connected at opposite ends to a beveled face 47L of the frame 47 and a beveled face 68U of the flange 68 by cap screws 78 and 79 respectively. Preferably square-shaped washers 76W–79W are interposed between the shoulder cap screws and the strips 72 and 74.

Thus, as best viewed in FIG. 3, the spaced-apart strips 72 and 74 are substantially transversely disposed in a manner such that like surfaces of the strips lie in planes which intersect in a line substantially coincident with the pivotal axis passing through the engaged portion of the rollring and the shaft and geometric center of the rollring. This pivotal axis is generally designated by the reference character P in FIG. 3. Thus, the rollring structure 64 is resiliently mounted for pivoting action within the frame 47 by means of the oppositely disposed flexure pivots 70 and 71.

In the operation of the embodiment illustrated in FIG. 2, a relatively small input signal torque is applied to the rollring structure 64 to tilt the rollring in a rotational direction YY, as indicated by the arrows in FIG. 2, about an axis passing through the point of contact 69 and the flexure pivots 70 and 71. This tilting is accomplished by flexing each of the strips in the flexure pivots 70 and 71 in a manner such that the strips 72 and 74 are slightly bowed from the neutral position illustrated in FIG. 3. At the same time the spring 63 is twisted a slight amount.

The resultant angular inclination of the rollring structure with respect to the rotating housing 51 of the ball spline causes the frictional contact of the rollring with the outer surface of the housing to move the housing 51 axially of the shaft 42 by rolling the housing along the balls 54. As described hereinbefore, the balls 54 are recirculated between opposite ends of the grooves 52 and 53. Thus, the rollring structure 64 remains in a fixed axial position with respect to the shaft 42, while the housing 51 and connected force output member 61 are movable axially of the shaft. This embodiment of the invention permits a considerable axial movement of the force output member to be obtained with no axial displacement of the rollring.

The above-described embodiments of this invention incorporate a single rollring and shaft arrangement. Additional thrust may be obtained by utilizing two or more rollrings and adding together the individual axial thrust developed by each rollring. FIG. 5 illustrates an embodiment of this invention wherein two rollrings are mounted in a deck member and engaged in frictional contact with two parallel, counter-rotating shafts in a manner such that the individual thrust of each rollring is applied to a common force output member.

In FIG. 5 a friction drive system is indicated generally by the reference numeral 81 and includes a frame 82. A pair of parallel counter-rotating shafts 83 and 84 are journaled at opposite ends for rotation within the frame 82 by ball bearings 85. A pair of intermeshing gears 86 and 87 are fixed on adjacent ends of the shafts 83 and 84 so that the shafts are rotatable in opposite directions at equal rotational speeds.

As best viewed in FIG. 6, a deck member 88 of an overall rectangular shape is partially split by a vertically extending slot 89 so that the deck member 88, which will hereinafter be referred to as a power deck, affords two mounting frames 88-1 and 88-2 for two individual rolling structures 91 and 92. The frames 88-1 and 88-2 are formed with circular apertures which mount the rollrings therein, and any suitable means may be provided for retaining the rollrings in their mounted position.

The rollring structures 91 and 92 comprise an inner race 91A and 92A respectively and an outer race 91B and 92B respectively. A plurality of balls as 93 and 94 are disposed between the inner and outer races so that each inner race is rotatable within the fixed outer race. The inner diameter of each of the inner races 91A and 92A is somewhat larger than the outside diameter of the shafts 83 and 84, which are encircled by the respective rollrings. The inner peripheral surfaces 91S and 92S of each of the inner races is convexly curved, as best viewed in FIG. 5.

The slot 89 extends for substantially the entire height of the power deck 88 and terminates in an enlarged, cylindrical shaped aperture 96 adjacent a lower edge of the power deck 88 as viewed in FIG. 6. A relatively thin web section 97 connects the two mounting frames 88-1 and 88-2. The web 97 affords a pivotal connection between the respective mounting frames which permits the mounting frames 88-1 and 88-2 to be moved toward one another by flexing of the web 97 so that the rollrings 91A and 92A may be frictionally engaged with the shafts 83 and 84 at areas of contact 98 and 99 respectively. The rounded periphery of the aperture 96 acts to prevent an accumulation of stresses in any one area due to such flexing action.

Each of the mounting frames 88-1 and 88-2 includes an upper bore 101 which extends through the length of the power deck in a direction transverse to the shafts 83 and 84. A bolt 102, which has a smaller diameter than that of the bore 101 is disposed within the bore. The bolt 102 includes an enlarged head 103 which provides an annular collar for engagement with a recessed face 104 at one end of the power deck. At an opposite end the bolt 102 has a nut 105 threaded thereon. A stack of Belleville springs 106 is interposed between the nut 105 and a recessed surface 107 of the power deck 88. Thus, adjustment of the nut 105 is effective to vary the force with which the rollrings 91A and 92A engage the shafts 83 and 84. This arrangement permits equal and oppositely directed forces to be exerted on the respective rollring and shaft combinations and the radial loads so applied are entirely contained within the power deck 88.

An output deck 111 is disposed transverse to the shafts 83 and 84 and includes circular apertures 112 and 113 which encircle the respective shafts 83 and 84 so as to permit the output deck to be moved axially of the shafts without any frictional contact therebetween.

Flexible connections interconnect the output deck 111 and the power deck 88 at adjacent ends. These flexible connections includes flexure pivots 113 and 114 and flexure plates 115 and 116. The flexure pivots are like those described with reference to FIGS. 3 and 4. Thus, the flexure pivot 113 includes a pair of spaced apart flexible strips 117 and 118 which are transversely disposed with respect to one another. Each strip is connected at opposite ends to a beveled face of the arm 108 and a beveled face of a floating member 119.

The floating member 119 is also connected to one end of the flexure plate 115. The opposite end of the flexure plate 115 is fixed within a slot formed in the output deck 111.

In like manner the flexure pivot 114 comprises flexible strips 121 and 122 which are connected at opposite ends to the arm 108 and a floating member 123. The transverse flexure plate 116 is mounted at opposite ends within slots formed in the floating member 123 and the power output deck 111.

As viewed in FIG. 5, the flexure plates 115 and 116 are transversely disposed with respect to the power output deck 111 and the power deck 88.

In operation, the power deck 88 is tilted about an axis which passes through the areas of contact 98 and 99 and through the flexure pivots 113 and 114. The signal torque for producing such tilting action may be applied manually or by any suitable means such as mechanical linkage or an electrical or a hydraulically actuated mechanism. The signal torque required is relatively small since such a signal torque need be sufficient only to overcome the frictional resistance to pivoting action at the areas of contact 98 and 99 and produce a slight flexing action of the individual strips of the flexure pivots. The radial loads applied to the rollring structures 91 and 92 are equal in magnitude and oppositely directed and completely contained within the power deck. The only friction that is mixed with the force input signal is that necessitated by the frictional engagement of the rollrings on the shafts.

Tilting of the power deck 88 causes the frictional engagement of the rollrings on the counter-rotating shafts to move the rollrings in the same axial direction and at the same rate along the shafts 83 and 84 by reason of the helical path that the contacting portions of the rollrings traverse on the outer surfaces of the shafts 83 and 84. The power deck thus imparts an axial movement to the power output deck 111 which in turn may be connected to any desired object.

The transverse flexure plates 115 and 116 provide an important function in that these plates take up any misalignment that might occur between the power deck, the drive shafts, and the output deck.

In FIG. 7, there is illustrated an embodiment of this invention which incorporates a dual shaft and power deck arrangement as illustrated in FIG. 5 but which includes means for obtaining reciprocable movement of the power deck axially of the drive shafts. Insofar as the component parts of the embodiment illustrated in FIGS. 7 and 8 are like those illustrated in FIGS. 5 and 6, like reference numerals will be used, but usually with the addition of the suffix "A" in FIGS. 7 and 8.

Referring now to FIGS. 7 and 8, there is illustrated a friction drive system which is designated generally by the reference numeral 111. The friction drive system 111 includes a pair of side rails 112 and 113 which are mounted on a base plate 114 and are connected by end blocks 115 and 116. The blocks 115 and 116, side rails 112 and 113, and base plate 114 form a rigid frame for two parallel and counter-rotating drive shafts 83A and 84A.

Each of the drive shafts 83A and 84A is rotatably mounted in the end blocks 115 and 116 by a ball bearing 119 at one end of the shaft and a needle bearing 121 at an opposite end. Suitable retaining rings 122 and 123 may be utilized to retain the ball bearing 119 within the block 115. As viewed in FIG. 7, the retaining rings 122 and 123 are mounted on the block 115 by studs 124 which have nuts 125 threaded on opposite ends.

Intermeshing gears 86A and 87A are mounted on the ends of the respective shafts 83A and 84A and the drive shaft 84A additionally is driven from a drive member 128 through a spline connection 129. The gears 86A and 87A have equal pitch diameters so that both of the drive shafts 83A and 84A are rotated at the same speed.

The embodiment of the invention illustrated in FIG. 7 includes a power deck 88A which is essentially like that illustrated in FIG. 6. Thus, the power deck 88A is partially split at 89A and includes two rollring structures, one of which, rollring structure 91, is shown in section in FIG. 7. The power deck includes outwardly projecting arms 108A, and flexure pivots 113A and 114A connect the arms 108A to floating members 119A and 123A, respectively. Transverse flexure plates 115A and 116A are each connected at one end to a floating member 119A and 123A respectively and are each connected at an opposite end to an output deck 111A by a plurality of shoulder cap screws 131, lock washers 132, and washers 133. Retaining rings 134 abut the outer races of the rollring structures to retain the rollring structures within the annular recesses formed in the power deck and cap screws 135 attach the retaining rings 134 to the power deck.

A power output shaft 136 is slidably disposed within a bearing 137 which in turn is retained within an aperture formed in the end block 116 by snap rings 138.

In accordance with this invention a pair of partially split wobble plates 141 and 142 are clamped at selected axial positions on the shaft 84A by threaded studs 143 and 144. As viewed in FIG. 8, the wobble plates 141 and 142 are seen to be canted on the shaft 84A. A plunger 146 is slidably mounted within a bore formed at the output deck 111A and is engageable at one end with one face of the power deck 88A. At an opposite end the plunger 146 is provided with an enlarged disc 147 which is engageable with the wobble plate 142. The face of the power deck 88A opposite that engageable with the plunger 146 is provided with a projecting boss 148 which is engageable with the wobble plate 141.

A generally L-shaped bracket 149 is attached to an underside of the output deck 111A by a cap screw 151 and extends beneath the flexure pivot 114A. The bracket 149 includes a knob 152 which projects from the outer edge of the bracket. A spring 153 is hooked at one end at the knob 152 and is hooked at an opposite end over the rod 102A which projects outwardly from the power deck. The spring 153 thus is disposed outwardly of the flexure pivot 114A.

A stop member 154 may be provided in the arm 108A and the floating member 119A to limit the angle to which the power deck may be tilted.

The spring 153 acts as an overcenter spring by exerting a force which is somewhat displaced from the tilt axis to tilt the power deck to a limiting position as determined by the stop 154. The power deck and the output deck then move as a unit in an axial direction which is dependent upon the direction of rotation of the shaft 84A and the direction in which the power deck was initially tilted. Assuming that the power deck initially moves to the left as viewed in FIG. 8, this axial movement of the power deck and output deck continues until the wobble plate 141, which rotates with the shaft 84A, engages the boss 148 and reverses the direction of the tilt of the power deck. Thereupon the spring 153 maintains the power deck in this tilted condition until the power deck moves rightwardly, as viewed in FIG. 8, to a position wherein the wobble plate 142 is effective to displace the plunger 146 to reverse the tilt and axial movement of the power deck. Thus, the power deck and output deck are reciprocated back and forth in an axial direction along the shafts 83A and 84A.

As in the other embodiments of this invention, any force exerted by the output deck 111A on a resisting object is not effective to vary the angular tilt of the power deck since the thrust is taken directly from the axis of tilt through the flexure pivots and the flexure plates 115A and 116A. This is clearly illustrated in the disposition of the flexure plate 116A and flexure pivot 114A illustrated in FIG. 8.

It is desirable that the extent of the axial movement of the rollrings and output deck be controllable in a manner such that varying predetermined amounts of such movement can be selected. This may be accomplished in a friction drive system which incorporates a dual shaft and power deck and output deck arrangement as illustrated in FIGS. 5–8 by adding a variable signal force input means together with a feed-back device which sums up the axial movement of the power and output decks and applies a force which is proportional to the amount of such movement in opposition to the input signal force. In such a servo arrangement the feed-back signal increases in magnitude with increasing axial travel of the power and output decks so that the feed-back signal continually builds up and eventually balances the input signal and thus returns the rollrings to a null, untilted position wherein the rollrings rotate freely about the shafts with no axial movement therebetween. In such an arrangement any given magnitude of the input signal force requires a corresponding axial displacement of the power and output decks before the feed-back device can be effective to apply a sufficiently large signal to balance the input signal and thus return the rollrings to the null positions. Thus, the magnitude of the input signal determines the extent of the axial movement.

An embodiment of this invention which incorporates such a servo arrangement is illustrated in FIGS. 9 and 10. In these figures, a friction drive system is designated generally by the reference numeral 161. The frictional drive system 161 incorporates dual, counter-rotating shafts and power and output decks like those incorporated in the embodiments illustrated in FIGS. 5–8, and like reference numerals, but usually with the addition of the suffix "B" in FIGS. 9 and 10, are used to designate like parts. Also the component parts of the servo system are set out in bold outline while phantom outlines are used to indicate the basic structure of the friction drive system.

Thus, in FIGS. 9 and 10, a rigid frame includes a pair of side rails 112B and 113B interconnected by a pair of end blocks 115B and 116B. Counter-rotating shafts 83B and 84B are rotatably mounted in the blocks 115B and 116B and a power deck 88B is partially split at 89B and mounts two rollring structures in the separate mounting frames formed by the split.

As illustrated in FIG. 10, the rollrings may be of a tapered roller construction rather than a ball bearing construction. Thus, the rollring structure 162, shown in section in FIG. 10, may comprise an inner race 163 and two axially spaced apart outer races 164 and 165. A plurality of tapered rollers 166 and 167 permit the inner race 163 to rotate within the outer races 164 and 165. This tapered roller construction is better suited for transmitting large radial loads and axial thrusts than a ball bearing rollring structure. As in the other embodiments of this invention, the inner periphery of the inner race 163 has a larger diameter than the outside diameter of the shaft 84B which it encircles and is formed to have a convexly curved inner surface 163S.

The power deck 88B is flexibly connected to an output deck 168 through flexure pivots 113B and 114B to floating members 119B and 123B and transverse flexure plates 115B and 116B. An output shaft 136B is slidably received within the block 116B and is actuated by movement of the output deck 168.

The output deck 168 includes a platform 169 which is formed with an upwardly projecting leg 171 as viewed in FIG. 10. A sleeve bearing 170 facilitates sliding movement of the platform leg 171 axially of the shaft 84B. An outwardly extending leg 172 is mounted on the upper edge of the leg 171 by a plurality of cap screws 173. A circular-shaped recess 174 is formed adjacent the outermost end of the leg 172 and the lower surface of the leg 172 may preferably be convexly dished out as at 175. An aperture 176 interconnects the recess 174 with the dished-out portion 175.

A tension block 177 includes an upwardly projecting shank 178 of smaller outside diameter than the aperture 176 so as to be axially freely movable therein. The tension block 177 also includes a downwardly depending arm 179. The shank 178 has an internally threaded bore and a cap screw 181 is adjustably positionable therein.

A stack of Belleville springs 182 is seated at one end on the base of the recess 174 and seated at another end on the annular collar afforded by the head of the cap screw 181 so that the tension block 177 is biased upwardly, as viewed in FIG. 10, by the force of the spring stack 182.

A mechanical amplifier rollring assembly 183 is disposed intermediate the platform leg 171 and the power deck 88B. The rollring assembly 183 comprises a generally circular-shaped carriage 184 having an upwardly projecting flange 185 and a downwardly projecting stud 186 at diagonally opposed portions of the carriage. A rollring structure 187 having an outer race 188 and an inner race 189 and a plurality of balls 191 therebetween, is retained within the carriage 184 by a retaining ring 192. The inner periphery of the inner race 189 encircles the shaft 84B and is of larger diameter than the shaft and is convexly curved as illustrated in FIG. 10.

A thin and narrow tension member 192 is connected by means of a rivet 193 to the depending arm 179 of the tension block 177. At an opposite end the tension member 192 is connected by cap screw 194 to the flange 185 of the rollring assembly 183. Thus, the spring stack 182 is effective to maintain the inner periphery of the rollring 189 in frictional engagement with the lower surface of the shaft 84B at an area of contact 196 and the radial load applied may be varied by adjustment of the cap screw 181.

The embodiment of the invention illustrated in FIGS. 9 and 10 incorporates means for tilting the rollring assembly 183 about an axis passing through the area of contact 196 and the tension member 192 in varying selected amounts of angular movement. These means include an actuator which is shown as a proportional electrical solenoid 197 in FIG. 9. In this instance a voice coil is utilized, but other electrical apparatus, such as torque motors could be utilized. Furthermore, while electrical means are illustrated, the actuator for producing the input signal can as well be manually, hydraulically, pneumatically, or mechanically actuated. The actuator 197 is mounted on the output deck 168 for movement therewith by a plurality of cap screws 198. The above-mentioned means also include a triangular-shaped bell crank 199 which is mounted for pivoting movement on the output deck 168 by a flexure pivot 201.

The flexure 201 comprises a flexible metal strip 202 which is connected at opposite ends by cap screws 203 to an outer edge of one arm 204 of the bell crank and to the surface of the output deck which faces the power deck. The flexure pivot 201 also comprises a flexible metal strip 205 which is connected at opposite ends by cap screws 206 to an outer edge of an arm 207 of the bell crank and an inner recessed surface in the output deck. The flexible strips 202 and 205 are transversely disposed with respect to one another and are slightly spaced apart in a vertical direction and are elastically deformable in a bowing action to permit the bell crank 199 to be pivoted about an axis passing through the flexure pivot in a frictionless manner.

As viewed in FIG. 10, the platform leg 171 is formed with a recess 208 so as to prevent any obstructing of the pivoting action of the bell crank 199 by the platform leg 171.

The outermost end of the arm 204 of the bell crank is connected to a plunger 209 of the solenoid 197 by an L-shaped bracket 211, and the arm 207 of the bell crank is connected to the rollring assembly 183 by a tie strip 212. As viewed in FIG. 10, the tie strip 212 is spaced from the flange 185 of the rollring carrier by a spacer 213 and a cap screw 214 connects the tie strip and the spacer to the flange 185.

One end of a drag link 215 is rotatably mounted on the stud 186 by a self-aligning ball bearing 216 and a snap ring 217, as viewed in FIG. 10. At an opposite end the drag link is pin joined at 218 to a lower end of a vertically extending lever 219. The upper end of the lever 219 is pin jointed at 221 between a pair of lugs 222 and 223 which are formed on a mounting pad 224, which in turn is connected as by means of cap screws to the outermost edge of the platform leg 172.

The power deck 88B includes a retaining ring 225 which has a pair of projecting lugs 226 and 227 formed integral therewith. A link 228 is pin jointed at one end by a roll pin 229 to a portion of the lever 219 which is intermediate the pin joints 218 and 221, and at an opposite end the link is pin jointed between the lugs 226 and 227 by a roll pin 231.

In the operation of the device thus far described, it will be assumed that the shaft 84B is rotating in a counter-clockwise direction looking along the shaft in the direction of the arrow A in FIGS. 9 and 10. The actuator may be energized to move the plunger 209 either inwardly or outwardly of the actuator 197. Also, the extent of such movement may be controlled by varying the magnitude of the current applied to the actuator 197. Assuming that the actuator is energized to move the plunger 209 outwardly of the actuator for a selected distance, the bell crank 199 is rotated in a clockwise direction about the flexure pivot 201 as viewed in FIG. 9. This rotational movement of the bell crank applies a tension force through the tie strip 212 through the lever afforded by the spacer 213 to rotate the rollring assembly 183 in a clockwise direction as viewed in FIG. 9. The frictional engagement of the rollring assembly at the area of contact 196 with the clockwise rotating shaft 84B moves the rollring assembly 183 axially of the shaft 84B in a rightward direction as viewed in FIGS. 9 and 10.

The input signal originally applied through the bell crank lever by the electrical actuator 197 to tilt the rollring assembly 183 is amplified by the frictional force developed by the radial load applied through the tension member 192 so that the rollring assembly 183 exerts an amplified, axially directed force through the drag link 215. The amplified axial force transmitted to the drag link 215 pivots the lever 219 about the roll pin 221 to tilt the power deck 88B in a clockwise direction as viewed in FIG. 10. The frictional engagement of the rollring carried within the power deck with the shafts 83B and 85B then moves the power deck in an axial rightward direction along the shafts 83B and 84B as viewed in FIGS. 9 and 10. Inasmuch as the output deck 168 is directly connected to the power deck 88B, the output deck including the platform 169, bell crank 199, and actuator 197 move axially with the power deck 88B.

In accordance with this invention servo means are provided for summing up the axial movement of the power and output decks and applying to the friction drive system a feed-back signal which is proportional in magnitude to the extent of the axial movement in a manner such that the feedback signal acts in opposition to the input signal to balance the input signal and return the rollrings to an untilted or null position.

As illustrated in FIG. 9, a slide bar 231 is mounted on the side rail 112B by cap screws 232. A slide block 233 is positionable at any desired location on the slide bar 231 by means of a set screw which is not illustrated. A feed-back adaptor block 234 is adjustably positionable on the slide block 233 by a ball joint connection that may be locked in a selected adjusted position. As illustrated in FIG. 11, one end of the block 234 is formed with internal splines 234S and an adaptor member 235 is formed with external splines 235S so as to be slidable within the adaptor block. A feed-back spring 236 has one end pinned to the adaptor member 235. An opposite end of the spring is connected by a cap screw 238 to an edge of a downwardly depending arm 237 of the bell crank 199, as illustrated in FIG. 10. Thus, any flexing of the spring 236 applies a moment to the bell crank 199 through the lever afforded by the cap screw connection 238 to the depending arm 237 which tends to rotate the bell crank about the pivot 201.

Assuming that the power deck and output deck are moving in an axial rightward direction as viewed in FIGS. 9 and 10 and as described hereinabove, the spring 236 is bent into a bow shape to apply a moment to the bell crank through the point of connection at the cap screw 238. This force acts to rotate the bell crank 199 in a counterclockwise direction, as viewed in FIG. 9, and this acts in opposition to the force exerted by the bracket member 211. This feed-back force increases in magnitude with increased flexing of the spring produced by increased axial travel of the power and output decks from their initial positions. The spline connection afforded by the members 234 and 235 permits the effective length of the connection between the adaptor block 234 and the bell crank 199 to be varied so that the only force exerted on the bell crank 199 is that developed by the deformation of the spring 236.

It will be apparent therefore that for any given magnitude of the input signal which is applied by the actuator 197 there is an axial displacement of the friction drive system which develops a feed-back signal of sufficient magnitude to return the bell crank and rollring drive assembly 183 and power deck 88B to the untilted positions illustrated in FIG. 9. In such positions the longitudinal axes of the various rollrings are parallel with the axes of the shafts 83B and 84B so that the inner races of the rollrings traverse a circular path about the surface of the shafts and no axial movement is imparted to the rollrings by the rotating shafts.

In various arrangements of the friction drive mechanisms illustrated in FIGS. 3–11 X-type flexures have been utilized to transfer the thrust from the power deck to the output deck. Such flexures serve a quite beneficial function of enabling the torque required to tilt the power deck to be kept at a minimum. However, in some instances a sufficiently large tilting torque may be available so that a larger amount of friction can be tolerated. In FIGS. 12–21 there is illustrated an arrangement of a friction drive mechanism constructed in accordance with another embodiment of this invention wherein a pair of rollrings mounted within a servo deck afford a larger torque for tilting the power deck than that available with the single servo rollring as utilized in the arrangement illustrated in FIGS. 9–11. Thus, with the ring illustrated in FIGS. 12–21 a self-aligning spherical pivot is utilized in place of X-type flexures for connecting the power deck with the output deck as will be described in detail hereinbelow.

In FIGS. 12 and 13 a servo-controlled, friction drive system is indicated generally by the reference character 301. The system 301 includes a rigid frame 302, which may be preferably formed in a casting process. Within the frame 302 a pair of shafts 303 and 304 are rotatably mounted within suitable bearings, such as bearings 306 and 307. Intermeshing gears 308 and 309 are affixed to adjacent ends of the shafts 303 and 304 and are rotatable by a third gear 311 which is adapted to be driven by a motor mountable within the leftwardmost end portion of the frame 302, as viewed in FIGS. 12 and 13.

As in the friction drive system illustrated in FIGS. 9 and 10, the friction drive mechanism 301 includes a power deck 312 and an output deck 315. However, and as pointed out hereinabove, a servo deck 314 is utilized in the friction drive mechanism 301 to tilt the power deck rather than a single servo ring like that included in the arrangement illustrated in FIGS. 9 and 10.

With reference to FIGS. 12 and 20 of the drawings, it is seen that the power deck 312 comprises a pair of adjacent frame members 313 and 314 which are interconnected by a web 316. A rollring structure 317, comprising an inner race 318 rotatably mounted within an outer race 319 by a plurality of roller bearings 321, is fixed in position within the frame member 313 by snap rings 322 and 323. The inner periphery of the inner race 318 presents a convex surface to the shaft 304, as illustrated in FIG. 12. The smallest internal diameter of the race 318 is somewhat greater than the exterior diameter of the shaft 304 so that there is only a small area of contact between the rollring and the shaft. A split ball bearing 324 is positioned adjacent the snap ring 323 within the deck 312 by a retaining ring 326. In like manner a rollring structure 327 is mounted within the frame member 314 of the power deck in encircling relation with the shaft 303.

The power deck 312 includes a bolt 328 which extends through a cylindrical bore 329 formed in each of the frame members. The frame member 313 is formed with a counterbore 331 and a plurality or Belleville springs 332 are stacked within the counterbore 331 so as to be compressible by the head of the bolt 328. Thus, whenever a nut 333 is turned down on the threaded end of the bolt 328, which projects from the termination of the bore 329 in the frame member 314, the spring stack 332 is compressed. The compressed springs exert a force tending to move the frame members 313 and 314 toward one another, by flexing the connecting web 316, to move the rollring structures 317 and 327 into engagement with the shafts 304 and 303 at areas 317A and 327A.

It may be noted that the bolt 328 is formed with a portion 328E of enlarged diameter intermediate the ends thereof. The diameter of the portion 328E of the bolt is just slightly less than that of the bore 329 so as to minimize any tendency of the bolt to shift radially within the bore. Also it should be noted that the bolt 328 is formed with an opening 336 which extends transversely therethrough and is adapted to be aligned with a corresponding elongated opening 337 formed in the power deck. These two openings 336 and 337 enable a coiled feed-back spring to be passed therethrough for a purpose to be described hereinafter.

In accordance with this invention the power deck 312 includes a stabilizing flexure strip 338 which is disposed opposite the web 316. The stabilizing strip 338 freely permits the frame members 314 and 313 to be moved toward one another by the force exerted by the spring stack 332 but effectively prevents the frame members from being moved laterally with respect to one another. Thus, the stabilizing strip prevents canting of one rollring with respect to the other.

The frame members 313 and 314 include respective recesses 339 and 341 in their inner, facing surfaces. These recesses afford a chamber for a spherical, self-aligning pivot 342 presently to be described in greater detail.

The output deck 315 as illustrated in FIGS. 12, 13, and 19, is mounted on the shafts 303 and 304 so as to be axially movable therealong. The output deck 315 includes an elongated opening 343 extending through the central portion thereof and mounts a control housing assembly 344 on the upper surface thereof. A support arm 346 is rigidly affixed to the output deck so as to project upwardly therefrom. With particular reference to FIGS. 13 and 19, it is seen that the output deck 315 is formed with a recess 347 in the lower portion of the surface facing the power deck 312. A pin 348 extends laterally across the chamber defined by this recess and a lever 349 is pivotally mounted on this pin by a bushing 351. A wire link 352 is attached to a lower end of the lever 349, as viewed in FIG. 13, and is also connected to a mounting pad 353 affixed to a lower edge of the power deck 312. Preferably, the wire link 352 is adhesively bonded or brazed to the lever 349 and the mounting pad 353 by a plastic steel compound, as indicated by the reference numerals 354 and 356.

With continued reference to FIGS. 19 and 16, it is seen that the surface of the output deck 315 opposed to that surface facing the power deck is formed with a pair of recesses 361 bordering the opening 343. These recesses 361 afford a seat for an annular shoulder 362 of a thrust output shaft 363, having a large diameter portion 363L and a smaller diameter portion 363S. Circular apertures 364 are also formed in the output deck 315 and the thrust output shaft 363 is retained in the position illustrated in FIG. 16 by cap screws 366 which are passed through the apertures 364 and threaded within the annular shoulder defined by the juncture of small and large diameter portions 363L of the thrust output shaft.

The large diameter portion 363L of the thrust output shaft is slidably mounted within one end of the frame 302 by a bearing 367, seal member 368, and retaining ring 369. The smaller diameter portion 363S of the thrust output shaft is pivotally connected to the power deck 312 by a self-aligning spherical pivot 342 as noted generally hereinabove, so that any movement of the power deck axially of the shafts 303 and 304 causes the output deck 315 to be moved in the same direction and to the same extent.

With particular reference to FIGS. 12 and 20, the self-aligning spherical pivot 342 is seen to comprise a U-shaped hanger member 367. The hanger member 367 is fixed in position within the chamber defined by the recesses 339 and 341 by a cap screw which extends through the slot defined between the two frame members 313 and 314 of the power deck and is threaded within the base of the U-shaped hanger member 367, as illustrated in FIG. 12. A pin 369 extends between the spaced-apart legs of the U-shaped hanger member, and a ball bearing 371 is mounted on the pin 369. The end of the thrust output shaft 363 is formed to the general configuration of an eyelet so as to encircle the outer race of the ball bearing 371 and thereby afford the pivotal connection to the hanger member 367 and the power deck 312.

The servo deck 514 is connected to the lever 349 by a wire link 377 (see FIG. 13) to tilt the power deck 312 and is in turn connected by a link 378 (see FIG. 12) to an actuating arm 376 of the control housing assembly 344 so as to be tiltable by the actuating arm 376.

The construction of the servo deck 514 is best illustrated in FIG. 18. A first rollring 379 is mounted within the servo deck 514 so as to encircle the shaft 304 and is adapted to be biased into engagement therewith. The rollring 379 is maintained in fixed position within the servo deck 514 by a plurality of buttonhead screws 381 and washers 382. A second rollring 383 is mounted within a frame member 384 which, in turn, is slidably positionable within a rectangular opening 386 formed in the servo deck. Preferably, buttonhead screws 387 and washers 388 are utilized to mount the rollring 383 within the frame member 384. The frame member 384 includes flanges 389 and 391 which serve as guides for contacting opposite surfaces of the servo deck 514 to prevent the frame member 384 and rollring 383 from moving other than a lateral direction within the servo deck. The rollring 383 encircles the shaft 303, and a shouldered screw 392 is adjustably positionable within a tapped opening 393 in an enlarged end of the servo deck to compress the stack of Belleville springs 394 between the shoulder of the screws and the frame member 384 to thereby bias the rollrings 383 and 379 into engagement with the shafts 303 and 304 at the respective areas 383A and 379A. The servo deck 514 also includes an up-standing flange 396 formed with a plurality of spring-mounting apertures 397. An elongated opening 398 is formed in the central portion of the servo deck 514 to enable the portion 363S of the thrust output shaft to be passed therethrough, and a circular opening 399 is formed adjacent the opening 398 to enable the wire link 377 (see FIG. 13) to be passed therethrough. As viewed in FIG. 13, the wire link 377 is attached to an adaptor plate 401 which, in turn, is mounted on the servo deck by a plurality of cap screws 402.

With particular reference now to FIGS. 12 and 19, it is seen that the control housing assembly 344 mounts an actuator 403, which, as noted hereinabove, can be electrically, pneumatically, hydraulically, or mechanically actuated. As illustrated, the actuator 403 is shown as an electrical solenoid which is disposed in hermetically sealed relation within the housing assembly 344. The plunger of the actuator 403 is connected through an L-piece 404 to the actuator lever 376, which as noted hereinabove, is connected to the servo deck by the wire link 378. The actuator lever 376 is mounted for pivoting action at a point between the end portions which are respectively connected to the L-piece 404 and wire link 378, by means including a plate 406, fixed to the actuator lever, a bar 407 rigidly affixed to the plate 406 and flexure strips 408–411 which interconnect the bar 407 and the support arm 346 mounted on the output deck 315. Flexible bellows 405 extend from the plate 406 to the housing 344 to seal off the actuator lever opening in the housing. In the enlarged view of FIG. 14 it is seen that flexure plates 408–410 define a rectangular-shaped connection surrounding but spaced from the actuating lever 376. The strip 408 is attached to the support arm 346 while the strip 409 is attached to the bar 407 so that the strips 410 and 411 may be flexed to enable the actuating lever 376 to pivot about the support arm 346. The actuating lever 376 includes a series of spring-attaching apertures 412, as viewed in FIG. 12, and a coil spring 413 is attached at one end to the actuating lever 376 and extends through the openings 337 and 336 in the power deck and the bolt 328. At its opposite end the spring 413 is connected to a spring-mounting plate 414, shown in enlarged detail in FIG. 17. The plate 414 is rigidly attached to the frame 302 and includes a plurality of spring-attaching apertures 416. The actuator 403, actuator lever 376, and spring 413 comprise signal input and signal feed-back elements of a servo control system which, in combination with the friction drive system including the servo deck, power deck, and output deck, enables the axial displacement of a thrust output shaft 363 to be accurately controlled as a function of the magnitude of the input signal developed by the actuator 403.

A terminal strip 496 is mounted within the frame 302, as illustrated in FIG. 12, so that control leads running to the actuator 403, but not illustrated in the drawings, can conveniently be attached thereto. Such leads may extend from the terminal strip 496 through an opening 417 in the portion of the frame supporting the gear ends of the shafts 303 and 304. Such an opening also affords a passageway for the flow of oil between the various compartments of the frame 302.

To initiate operation of the servo control friction drive apparatus 301, the actuator 403 is energized to pivot the actuator lever 376 about the flexure connection to the support arm 346. Assuming that the actuator 403 is energized to pivot the actuator lever 376 in a clockwise direction about the support arm 346, as viewed in FIG. 12, and further assuming that the shaft 304 is rotated in a clockwise direction, as viewed from the gear end of the shaft and in the direction of the arrow D, the wire link 378 causes the servo deck 514 to be tilted about the areas of engagement 378A and 379A with the shafts 303 and 304 in a clockwise direction as viewed in FIG. 13. Such tilting of the servo deck causes the servo deck to be frictionally driven in an axial direction along the shafts 303 and 304 toward the output deck 315. Such relative movement between the servo deck and the output deck, in turn, tilts the lever 349 in a clockwise direction about the pin 348, as viewed in FIG. 13. The lever 349 exerts a force through the wire link 325 to tilt the power deck 312 about an axis passing through the areas of engagement 327A and 317A with the shafts 303 and 304 in a clockwise direction as viewed in FIG. 13, whereupon the power deck exerts a thrust through the self-aligning pivot 342 on the thrust output shaft 363 to move the output deck and the thrust output shaft in the same direction and at the same rate of movement as the servo deck 514. Thus, the three decks and the output shaft are moved axially in the direction of the arrow E in FIG. 13 by reason of the angular inclination of the servo deck and power deck. It will be recognized that such movement of the output deck is effective to develop a force within the spring 413 which is proportional to the extent of movement of the output deck from its initial position and which acts in opposition to the input signal force to tend to rotate the actuator lever 376 in a counterclockwise direction, as viewed in FIG. 12. Since the speed of progression of the rollrings is dependent upon the extent to which they are tilted from the equilibrium position and because the initial tilt of the rollrings is progressively reduced by the spring 413, the rate of axial movement of the decks diminishes as the decks approach a position corresponding to the magnitude of the input signal. When this latter condition is obtained, the force of the spring 413 exactly counterbalances the input signal, and the servo control friction drive system is restored to a condition of equilibrium wherein the rollrings traverse circular paths on the peripheries on the shafts 303 and 304. It will be recognized that the spring 413 is effective to return the component parts of the system 301 to their initial position by a sequence of operations opposite that described immediately above whenever the actuator 403 is deenergized.

The manner in which two servo-controlled rollrings are mounted within a servo deck in the arrangement illustrated in FIGS. 12 and 13 enables a considerable larger thrust to be developed and applied to tilt the power deck than is possible with the arrangement illustrated in FIGS. 9 and 10. Since two rollrings are utilized, twice as much thrust is produced as is produced by a single rollring. In addition the servo deck 514 of the arrangement illustrated in FIGS. 12 and 13 eliminates any connection to the ground, or output deck, which could absorb part of the force output of the actuator. Another important feature of the arrangement illustrated in FIGS. 12 and 13 is the manner in which the wire link 377 is connected about half way between the areas 383A and 379A of engagement with the shafts 303 and 304. By reason of this manner of connecting the wire link 377, any movement tending to cause the servo rings to cock is practically non-existent.

In some instances it may be desirable to have resort to an arrangement which develops larger axial thrusts than those produced by the friction drive systems described hereinabove. In FIGS. 22 and 23 there is illustrated a friction drive system 451 constructed in accordance with another embodiment of the invention wherein a pair of rollrings are pressed into frictional engagement by a spring loaded shaft to develop larger radial loadings and thus enable increased axial thrusts to be obtained as compared to the thrusts generated in the arrangements heretofore described. In the friction drive system 451 a first rotatable shaft 452 is journaled at one end within a bearing 453 mounted within a fixed position within a frame 454. A second rotatable shaft 456 is also journaled within a bearing 457, but the bearing 457, rather than being mounted in a fixed position within the frame 454, is mounted within a collar 458 which is slidable within a guide way 459 formed within the frame 454 so as to be movable toward and away from the shaft 452. A shouldered set screw 461 is adjustably positionable within the frame 454 so as to exert a variable biasing force on the collar 458 through a stack of Belleville springs 462 interposed between the flange shoulder of the set screw and the collar 458. Preferably, the collar 458 is formed with a radial opening 463 for receiving the innermost end of the screw 461 so that the collar 458 is at all times maintained in alignment with the screw 461. The frame 454 also mounts a sleeve bearing 464 in a central portion thereof, and a thrust output shaft 466 is slidably received within the sleeve bearing.

A pair of identical rollrings 467 and 468 encircle the respective shafts 452 and 456 and are generally in the shape of a U in cross section, as illustrated in FIG. 22. Thus, the rollring 468 includes a pair of outwardly projecting flanges or legs 468F joined together by a web 468W. Likewise, the rollring 467 includes a pair of flanges 467F joined by web 467W. The inner peripheries of the rollrings are convexly curved, as illustrated in FIG. 22.

As viewed in FIG. 23, the biasing force exerted by the compressed spring stack 462 is effective to maintain the shaft 452 in engagement with the rollring 467 at area of contact 467A. The biasing force of the spring stack also maintains the rollring 468 in engagement with the shaft 456 at 468A and the adjacent peripheries of the flanges of the respective rollrings in engagement with one another at 470. In this manner quite large radial loads may be applied to the friction drive system and these radial loads are carried by the rollrings rather than radial thrust bearings as in the embodiments heretofore described.

In order that the rollrings my be conveniently tilted and a resultant axial thrust transmitted to the output shaft 466, a deck plate 471 and a self-aligning joint or pivot 472 are included in the friction drive system 451. As viewed in FIG. 23, the deck plate 471 includes an elongated opening 473 in the central portion thereof, which opening is adapted to accommodate the self-aligning joint 472 therein. The deck plate 471 is maintained in a fixed position between the flange portions of the respective rollrings 467 and 468 by a pair of radial ball bearings 474 and 476. The outer race of the ball bearing 476 is received within an annular groove 477 formed in the deck member 471 while the inner race is received within an annular groove 478 formed in the web section 468W of the rollring. The relationship between the diameters of the annular groove 478 and the inner race of the bearing 477 is such that the ball bearing 476 may move radially within the groove 478 to accommodate the relative movement therebetween so as to offer no resistance to the variable biasing force applied by the stack of springs 462. In like manner the outer race of the ball bearing 474 is received within annular grooves formed in the deck plate 471 and the web section of the rollring 467 with the inner race of the bearing 474 being radially movable within the groove formed in the rollring.

The self-aligning jont 472 incluudes a pin 481 which extends radially across the opening 473 along the axis extending between the centers of the shafts 452 and 456, and a bearing 482 is carried thereon. The self-aligning joint 482 further includes a hanger bar 483 formed with an eyelet construction which mounts the bearing 482 therein. The hanger bar 483 includes axially extending legs 483F which are spaced from the outer peripheries of the rollrings 467 and 468 and which extend from within the opening 473 of the deck plate to the thrust output shaft 456 so as to afford a connection from the deck plate to the thrust output shaft.

As noted hereinabove, the large radial load is carried by the rollrings 467 and 468. The axial or thrust load alone is carried by the ball bearings 474 and 476. Thus, upon a tilting force being applied to the deck plate 471, by any suitable means, the rollrings 467 and 468 are likewise tilted about the areas of engagement 467A and 468A with the shafts 452 and 456 so that the rollrings and the deck plate are moved in an axial direction, which is dependent upon the direction of rotation of the shafts and the direction in which the deck plate is tilted. Inasmuch as quite large radial forces can be developed between the shafts and the rollrings in the arrangement illustrated in FIGS. 22 and 23, the friction drive system 451 enables correspondingly large axial thrust to be transferred through the self-aligning joint 472 to the thrust output shaft 466.

Thus, in accordance with this invention a radial load may be applied to a rollring in a manner such that the radial load mixes a minimum of friction with a signal force applied to tilt the rollring. Two or more rollrings may be connected in a manner such that the individual rollrings may be tilted simultaneously as one unit and the individual thrusts of each rollring may be added together in a common force output member. A servo system may be utilized to obtain a variable selected axial movement of the rollrings.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a friction drive system of the kind including an annularly divided rollring structure including a rollring, a rotatable shaft, and fixed supporting structure and wherein a portion of the periphery of the rollring is engaged in frictional contact with the shaft so that rotation of the shaft frictionally drives the rollring structure axially of the shaft upon a signal force being applied to tilt the rollring from a null position in which the axis of the rollring is parallel to the axis of the shaft; force applying means for applying a biasing force to the rollring to produce said frictional contact including an elastically deformable tension member which is connected at opposite ends to the support structure and the rollring structure and which is torsionally deformable in a substantially frictionless manner upon tilting of the rollring from said null position to minimize mixing of frictional forces resulting from the biasing force with the signal force.

2. In a friction drive system of the kind including a rollring having a central opening of a given diameter, a shaft of smaller diameter than said given diameter extending through said opening, and fixed supporting structure and wherein a portion of the inner periphery of the rollring is engaged in frictional contact with the shaft so that rotation of the shaft frictionally drives the rollring axially of the shaft upon a signal force being applied to tilt the rollring from a null position in which the axis of the rollring is parallel to the axis of the shaft; force applying means for applying a biasing force to the rollring to produce said frictional contact including an elastically deformable tension member which is connected to the fixed supporting structure and the rollring and which is torsionally deformable in a substantially frictionless manner upon tilting of the rollring from said null position to minimize mixing of frictional forces resulting from the biasing force with the signal force.

3. Apparatus for converting rotational motion to axial motion comprising, a rotatable shaft of given external diameter, a rollring of greater internal diameter than the external diameter of the shaft and encircling the shaft, means for engaging a portion of the internal surface of the rollring in pressure contact with the external surface of the shaft, said means comprising a support and a flexible, resilient, tension member connected at one end to said support and at the opposite end to a portion of the rollring which is diametrically opposed to that portion engaged with the shaft, and signal means engageable with the rollring for tilting the rollring about an axis passing through the center of the rollring and through the engaged portions of the rollring and the shaft, to move the rollring axially relative to the shaft in response to rotation of the shaft, said tension member being elastically deformable to provide for essentially frictionless movement of said rollring relative to said support.

4. In a friction drive system of the kind including an annularly divided rollring structure including a rollring having a central opening of given internal diameter and a rotary shaft of smaller external diameter extending through the opening in the rollring, means for biasing the inner periphery of the rollring into frictional engagement with the shaft including, a support, a flexible, elastically deformable, tension member attached at one end to the outer periphery of the rollring structure, and resilient means mounted on the support and attached to the tension member at an end opposite that attached to the rollring structure, the rollring being tilted about an axis passing through the tension member through torsional deformation of the tension member, whereby rotation of the shaft moves the rollring axially of the shaft independently of any movement of the support by varying the length of said resilient means.

5. Apparatus for converting a rotary torque to an axial force comprising, a rotatable shaft having a given external diameter, a rollring encircling the shaft and having a greater internal diameter than the external diameter of the shaft, means for engaging a portion of the inner periphery of the rollring in pressure contact with the external surface of the shaft, said means comprising a support and a flexible, resilient, tension member having one end attached to the outer periphery of the rollring at a portion which is diametrically opposed to that engaged with the shaft and having another end mounted on said support, and a force output member pivotally connected to said rollring on an axis of tilt passing through the tension member and through the area of contact between the shaft and the rollring, whereby rotation of said shaft with said rollring in a tilted position develops an axially directed force in said output member.

6. Apparatus for converting rotational motion to axial motion comprising, a rotatable shaft having a given external diameter, a rollring having a greater internal diameter than the external diameter of the shaft and encircling the shaft, force applying means for engaging a portion of the inner periphery of the rollring in pressure contact with the external surface of the shaft, said force applying means comprising a support mounted for axial movement along the shaft and a flexible, resilient, tension member having one end mounted on said support and another end attached to a portion of the rollring which is diametrically opposed to that engaged with the shaft, signal means engageable with the rollring for tilting the rollring about an axis passing through the center of the rollring and through the engaged portions of the rollring and the shaft, and force output means connected to both the rollring and said support, whereby rotation of the shaft and tilting of the rollring by said signal means moves the support and signal means in an axial direction along the rotating shaft.

7. Apparatus for converting rotational movement to axial movement comprising, a rotatable shaft, a cylindrical internally splined housing mounted on said shaft for rotational movement with the shaft and axial movement along the shaft, a rollring encircling the housing and having a larger internal diameter than the external diameter of the housing, and force applying means, including an elastically deformable tension member resiliently mounted at one end on a support structure and attached at another end to the outer periphery of the rollring, for biasing the rollring toward the cylindrical surface of the housing to bring a friction portion of the inner surface of the rollring into frictional engagement with the cylindrical surface of the housing, said tension member being elastically deformable to permit tilting of the rollring about an axis passing through the tension member to frictionally drive the rotating splined housing axially of the shaft.

8. Apparatus for converting rotational motion to axial motion comprising, a frame having a shaft rotatably mounted therein, means for rotating said shaft, a cylindrical surface ball spline mounted on said shaft for rotation with the shaft and axial movement along the shaft, an annularly divided rollring structure including a rollring encircling the ball spline and having a larger internal diameter than the external diameter of the ball spline, force applying means for biasing a portion of the inner periphery of the rollring into frictional engagement with the cylindrical surface of the ball spline and including an elastically deformable tension member resiliently mounted at one end on supporting structure and attached at another end to the outer periphery of the rollring structure, pivot means resiliently supporting the rollring structure for pivoting action about an axis passing through both the tension member and the engaged portions of the rollring and the spline, said pivot means comprising two pairs of flexure members disposed at diametrically opposed portions of the external periphery of the rollring structure, each of said pairs comprising two spaced apart and substantially transversely disposed flexible metal strips each of which is connected at opposite ends to the frame and the external periphery of the rollring structure, whereby the rollring structure may be tilted by frictionless flexure of said metal strips to impart axial movement to the rotating spline.

9. A power deck for use in a friction drive system of the kind including a pair of parallel rotatable shafts and wherein individual rollrings encircle a shaft and area each tiltable about an area of frictional engagement with a shaft so as to be moved axially of the shaft by rotation of the shaft, said power deck comprising, a pair of adjacent, spaced frames, each having a rollring mounted therein for encircling a respective one of the pair of shafts, said frames being connected together for pivoting action toward and away from one another, and adjustable force applying means mounted on said frames for applying equal and opposite forces to said frames to pivot said frames about the connection to vary the spacing between the centers of the rollrings and thereby maintain the rollrings in adjustable frictional engagement with said parallel shafts.

10. In a friction drive system of the kind wherein an annularly divided rollring structure including a rollring surrounds a rotatable shaft and is tiltable about an area of frictional engagement with the shaft so as to be moved axially of the shaft by rotation of the shaft, first and second parallel, spaced apart, rotatable shafts, first and second annularly divided rollring structures disposed in encircling relation with the respective first and second shafts, means interconnecting the first and second rollring structures for transmitting equal radial loads therebetween and for maintaining said rollrings in corresponding angular positions relative to their associated shafts, and a force output member connected to each of said first and second rolling structures, whereby the individual axial thrusts of each rollring are additive in said force output member.

11. In a friction drive system of the kind wherein a rollring surrounds a rotatable shaft and is tiltable about an area of frictional engagement with the shaft so as to be moved axially of the shaft by rotation of the shaft, a pair of parallel, spaced apart, rotatable shafts, a power deck disposed transversely to the shafts and comprising a pair of adjacent spaced apart frames, each having a rollring which encircles one of said rotatable shafts mounted therein, said frames being connected together for pivotal movement relative to each other, force applying means mounted on said power deck for applying equal and opposite forces to said frames and pivoting said frames with respect to each other to engage a portion of the inner periphery of each of the rollrings in frictional contact with one of the shafts, an output deck disposed generally parallel to the power deck, and a connection between the power deck and the output deck which includes pivot means mounted on the ends of the power deck for permitting pivoting of the power deck about an axis passing through the engaged portions of the shafts and rollrings, whereby the power deck may be tilted about said axis to impart an axial thrust to the output deck.

12. In a friction drive system of the kind wherein a rollring surrounds a rotatable shaft and is tiltable about an area of frictional engagement with the shaft so as to be moved axially of the shaft by rotation of the shaft, a pair of parallel, spaced apart, rotatable shafts, a power deck disposed transversely to the shafts and comprising, a pair of adjacent spaced apart frames, each having a rollring mounted therein which encircles one of said rotatable shafts, said frames being connected together for pivoting movement relative to each other, force applying means mounted on said power deck for applying equal and opposite forces to said frames and pivoting said frames about the connection to engage a portion of the inner periphery of each of the rollrings in frictional contact with one of the shafts, and means for tilting the power deck relative to said shafts to cause continuous reciprocable motion of the power deck between two axial positions on the rotatable shafts.

13. In a friction drive system of the kind wherein a rollring surrounds a rotatable shaft and is tiltable about an area of frictional engagement with the shaft so as to be moved axially of the shaft by rotation of the shaft, a pair of parallel, spaced apart, rotatable shafts, a power deck disposed transversely to the shafts and comprising, a pair of adjacent, spaced apart frames, each having a rollring which encircles one of said rotatable shafts mounted therein, said frames being pivotally connected together to engage a portion of the inner periphery of each of the rollrings in frictional contact with one of the shafts, an output deck disposed generally parallel to the power deck, means interconnecting the power and output decks including, pivot means mounted on the ends of the power deck for permitting pivoting of the power deck about an axis passing through the engaged portions of the shafts and rollrings, and a pair of flexible plate members, each connected at opposite ends to an end of the output deck and the pivoting means, whereby the flexible plate members are laterally elastically deformable to compensate for any misalignment between the power deck, rotatable shafts, and output deck.

14. In a friction drive system of the kind wherein a rollring surrounds a rotatable shaft and is tiltable about an area of frictional engagement with the shaft so as to be moved axially of the shaft by rotation of the shaft, a pair of parallel, spaced apart, rotatable shafts, a power deck disposed transversely to the shafts and comprising, a pair of adjacent, spaced apart frames, each having an annularly divided rollring structure including a rollring which encircles one of said rotatable shafts mounted therein, said frames being pivotally connected together to engage a portion of the inner periphery of each of the rollrings in frictional contact with one of the shafts, an output deck disposed generally parallel to the power deck, means interconnecting the power and output decks including a pair of connecting members mounted at opposite ends of the output deck and projecting toward corresponding ends of the power deck, and a flexure pivot mounted at each end of the power deck and connected to one of the connecting members for transmitting an axial thrust from the power deck through the connecting members to the output deck, each of said flexure pivots including two spaced apart and substantially transversely disposed flexible metal strips connected at opposite ends to the power deck and one of the connecting members whereby the power deck may be tilted by frictionless flexure of said metal strips.

15. A friction drive mechanical amplifier system comprising, a rotatable shaft, a first annularly divided rollring structure including a first rollring having a larger internal diameter than the diameter of the shaft, said first rollring being force biased to a position wherein a portion of the inner periphery of the rollring frictionally contacts the shaft and being tiltable about a first axis passing through the center of the rollring and the contact with the shaft, a second annularly divided rollring structure including a second rollring having a larger internal diameter than the diameter of the shaft, said second rollring being force biased to a position wherein a portion of the inner periphery of the rollring frictionally contacts the shaft at a location angularly displaced 90° about the surface of the shaft from the area of contact of said first rollring on the shaft, said second rollring being tiltable about a second axis passing through the center of rotation of the second rollring and the contact with the shaft, said first and second rollrings being axially spaced from one another on the shaft, and a link member interconnecting a portion of the outer annulus of the first rollring structure which is adjacent the first tilt axis and a portion of the outer annulus of the second rollring structure which is displaced from the second tilt axis, whereby a force applied to tilt said first rollring about the first axis is amplified by the frictional engagement of the rollring on the rotating shaft and is exerted as a larger force on the second rollring to tilt the second rollring about the second axis whereby both rollrings are frictionally driven axially of the shaft.

16. A friction drive servo system comprising, a rotatable shaft, a rollring biased to a position wherein a portion of the inner periphery of the rollring frictionally engages the shaft and tiltable about an axis passing through the center of the rollring and the engaged portions of the rollring and the shaft, signal input means for applying a variable magnitude input signal to tilt the rollring about said axis from a null position wherein the rollring rotates at a fixed axial position on the shaft to a position wherein rotation of the shaft frictionally drives the rollring axially of the shaft, and feed-back means for summing up the axial movement of the rollring and tilting the rollring back toward the null position an angular amount which is dependent upon the axial movement, whereby the extent of the axial movement of the rollring is dependent upon the magnitude of the input signal.

17. A friction drive servo system comprising, a rotatable shaft, a rollring biased to a position wherein a portion of the inner periphery of the rollring frictionally engages the shaft and tiltable about an axis passing through the center of the rollring and the engaged portions of the rollring and the shaft, signal input means for applying a variable magnitude input signal to tilt the rollring about said axis from a null position wherein the rollring rotates at a fixed axial position on the shaft to a position wherein rotation of the shaft frictionally drives the rollring axially of the shaft, said signal input means being mounted for movement with the rollring along the shaft, and means mounted at a fixed axial position with respect to the shaft and connected to the signal input means for summing up the axial movement of the rollring and applying a feed-back signal in opposition to the input signal, whereby the feed-back signal returns the rollring to said null position upon a predetermined amount of axial movement of the rollring.

18. A friction drive servo system comprising, a rotatable shaft, an annularly divided rollring structure including a rollring biased to a position wherein a portion of the inner periphery of the rollring frictionally engages the shaft and tiltable about an axis passing through the center of the rollring and the engaged portions of the rollring and the shaft, signal input means including a pivotally mounted bellcrank connected to the rollring structure and rotatable to transmit an input signal to tilt the rollring about said axis from a null position wherein the rollring rotates at a fixed axial position on the shaft to a position wherein rotation of the shaft frictionally drives the rollring axially of the shaft, said signal input means being mounted for movement with the rollring structure along the shaft, and means mounted at a fixed axial position with respect to the shaft and connected to the bellcrank for summing up the axial movement of the rollring and applying a feed-back signal to rotate the bellcrank in a direction opposite that produced by the input signal, whereby the feed-back signal returns the rollring to said null position upon a predetermined amount of axial movement of the rollring structure.

19. A friction drive servo system comprising, a rotatable shaft, an annularly divided rollring structure, including a rollring biased to a position wherein a portion of the inner periphery of the rollring frictionally engages the shaft and tiltable about an axis passing through the center of the rollring and the engaged portions of the rollring and the shaft, signal input means for applying an input signal to tilt the rollring structure to tilt the rollring about said axis from a null position wherein the rollring rotates at a fixed axial position on the shaft to a position wherein rotation of the shaft frictionally drives the rollring axially of the shaft, said signal input means being mounted for movement with the rollring structure along the shaft, and spring means mounted at a fixed axial position with respect to the shaft and connected to the signal input means for summing up the axial movement of the rollring and applying a feed-back signal varying in magnitude with the extent of said axial movement in opposition to the input signal, whereby the feed-back signal returns the rollring to said null position upon a predetermined amount of axial movement of the rollring structure.

20. A friction drive servo system comprising, a rotatable shaft, first and second annularly divided rollrings each including a rollring and each biased to a position wherein a portion of the inner periphery of each rollring frictionally engages the shaft and each rollring structure being tiltable about an axis passing through the center of the rollring and the engaged portions of the rollring and the shaft, signal input means including said first rollring structure and a linkage interconnecting the first and second rollring structures for applying an input signal to tilt the first and second rollrings about said axes from a null position wherein the rollrings rotate at a fixed axial position on the shaft to a position wherein rotation of the shaft frictionally drives the rollrings axially of the shaft, said signal input means being movable with the rollring structures along the shaft, and means mounted at a fixed axial position with respect to the shaft and connected to the signal input means for summing up the axial movement of the rollrings and applying a feed-back signal in opposition to the input signal, whereby the feed-back signal returns the rollrings to said null position upon a predetermined amount of axial movement of the rollring structures.

21. In a friction drive system of the kind wherein a rollring surrounds a rotatable shaft and is tiltable about an area of frictional engagement with the shaft so as to be moved axially of the shaft by rotation of the shaft, a pair of parallel, spaced apart, rotatable shafts, a power deck disposed transversely to the shafts and comprising a pair of adjacent spaced apart frames, each having a rollring which encircles one of said rotatable shafts mounted therein, said frames being connected together for pivotal movement relative to each other, force applying means mounted on said power deck for applying equal and opposite forces to said frames and to move said frames with respect to each other to engage a portion of the inner periphery of each of the rollrings in frictional contact with one of the shafts, force output means, and a connection between the power deck and the output means which include pivot means mounted between said frames for permitting pivoting of the power deck about an axis passing through the engaged portions of the shafts and rollrings, whereby the power deck may be tilted about said axis to impart an axial thrust to the output means.

22. In a friction drive system of the kind wherein a rollring surrounds a rotatable shaft and is tiltable about an area of frictional engagement with the shaft so as to be moved axially of the shaft by rotation of the shaft, a pair of parallel, spaced apart, rotatable shafts, a power deck disposed transversely to the shafts and comprising a pair of adjacent spaced apart frames, each having a rollring which encircles one of said rotatable shafts mounted therein, said frames being connected together for pivotal movement relative to each other, force applying means mounted on said power deck for applying equal and opposite forces to said frames and to move said frames with respect to each other to engage a portion of the inner periphery of each of the rollrings in frictional contact with one of the shafts, force output means, a connection between the power deck and the output means which includes pivot means mounted between said output means and each of said frames for permitting pivoting of the power deck about an axis passing through the engaged portions of the shafts and rollrings, and means for tilting the power deck about said axis including a pair of rollrings engaged with said shafts and mounted within a servo deck connected to the power deck, said means for tilting the power deck also including actuator means for tilting the servo deck.

23. A power deck for use in a friction drive system of the kind including a pair of parallel rotatable shafts and wherein individual rollrings encircle a shaft and are each tiltable about an area of frictional engagement with a shaft so as to be moved axially of the shaft by rotation of the shaft, said power deck comprising, a pair of adjacent, spaced frames, each having a rollring mounted therein for encircling a respective one of the pair of shafts, means connecting said frames together for movement toward and away from one another and including a flexible web and a stabilizing strip at opposed central portions of said power deck, and force applying means mounted on said frames for applying forces to said frames to move said frames toward one another by flexing said web, said stabilizing strip serving to prevent canting of one frame member with respect to the other frame member.

24. A deck for use in a friction drive system of the kind including a pair of parallel rotatable shafts and wherein individual rollrings encircle said shafts and are each tiltable about an area of frictional contact with a shaft so as to be movable axially of the shaft by rotation of the shaft, said deck comprising; a first member mounting within said first member so as to be slidable toward and away from said first rollring, a second rollring mounted for rotation within said frame member, and means for biasing said frame member and second rollring toward said first rollring.

25. A variable speed drive comprising; first and second rotatable drive members disposed in spaced parallel relation with respect to each other; a first rollring, encompassing said first drive member and disposed in tangential frictional driving engagement with said first drive member; a second rollring, encompassing said second drive member and disposed in tangential frictional driving engagement with said second drive member, means biasing one of said drive members toward the other drive member and maintaining said rollrings in torque transmitting frictional engagement with each other, force output means, deck means for simultaneously tilting said rollrings about an axis passing through the centers thereof to cause said rollrings to move axially of said drive members, and means connecting said deck means and said force output means including a self-aligning, spherical pivot disposed medially of the centers of said rollrings on the axis passing therethrough.

References Cited by the Examiner
UNITED STATES PATENTS

| | | | |
|---|---|---|---|
| 2,583,790 | 1/52 | Mikina | 74—191 X |
| 2,664,754 | 1/54 | Brown | 74—25 X |
| 2,912,868 | 11/59 | Preskitt | 74—193 X |
| 2,940,322 | 6/60 | Uhing | 74—193 X |

BROUGHTON G. DURHAM, *Primary Examiner.*